(12) United States Patent
Oka et al.

(10) Patent No.: US 7,751,005 B2
(45) Date of Patent: Jul. 6, 2010

(54) LIQUID CRYSTAL DISPLAY APPARATUS

(75) Inventors: Shigeki Oka, Tokyo (JP); Noriki Tachibana, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 264 days.

(21) Appl. No.: 11/862,282

(22) Filed: Sep. 27, 2007

(65) Prior Publication Data

US 2008/0084523 A1    Apr. 10, 2008

(30) Foreign Application Priority Data

Oct. 5, 2006   (JP) .............................. 2006-273788
Feb. 20, 2007  (JP) .............................. 2007-039148

(51) Int. Cl.
*G02F 1/1335*   (2006.01)
(52) U.S. Cl. .................. 349/118; 349/96; 349/117; 349/119; 349/120

(58) Field of Classification Search .............. None
See application file for complete search history.

(56) References Cited

U.S. PATENT DOCUMENTS

2009/0009693 A1* 1/2009 Yoshikawa et al. ............ 349/75
2009/0021671 A1* 1/2009 Fukagawa et al. ............. 349/96

* cited by examiner

*Primary Examiner*—Richard H Kim
(74) *Attorney, Agent, or Firm*—Lucas & Mercanti, LLP

(57) ABSTRACT

An IPS (In Plane Switching) mode type liquid crystal display apparatus having polarizing plates on both sides of a liquid crystal cell, wherein the polarizing plate protective film used between a liquid crystal cell and polarizer on a backlight light-source side is a cellulose ester film having a thickness of 20-50 μm and a retardation value of 0 nm$\leq$Ro$\leq$2 nm and −5 nm$\leq$Rt$\leq$5 nm, and this cellulose ester film is characterized by temperature variation ΔRt(t) lying in the range 0 nm$\leq$ΔRt(t)$\leq$7 nm and humidity variation ΔRt(h) lying in the range 0 nm$\leq$ΔRt(h)$\leq$20 nm.

12 Claims, 1 Drawing Sheet

LIQUID CRYSTAL DISPLAY APPARATUS

This application is based on Japanese Patent Application No. 2006-273788 filed on Oct. 5, 2006, and No. 2007-039148 filed on Feb. 20, 2007, in Japanese Patent Office, the entire content of which is hereby incorporated by reference.

FIELD OF THE INVENTION

The present invention relates to an IPS type liquid crystal display apparatus characterized by its reduced irregularity of screen display resulting from variation in temperature and humidity.

BACKGROUND OF THE INVENTION

The IPS (namely In Plane Switching) mode type liquid crystal display apparatus has been placed on the market due to its excellent characteristics such as minimum variation in luminance at any viewing angle and minimal decline in response speed in halftone mode in the liquid crystal mode of the liquid crystal display apparatus. The IPS type liquid crystal display apparatuses are exemplified by an FFS (namely Fringe Field Switching) and an FLC (namely Ferroelectric Liquid Crystal) mode apparatuses, in addition to the IPS mode apparatus.

In the IPS type liquid crystal display apparatus, a retardation film and a polarizing plate protective film located between the liquid crystal cell and polarizer are intended to improve the viewing angle and to reduce color shift. A great difference is exhibited when compared with a TN (namely Twisted Nematic) type liquid crystal and a VA (namely Vertical Alignment) liquid crystal.

In Patent Document 1, a technique is proposed, for example, when a retardation film wherein Rt is −30 nm and Ro is 130 nm is used on the viewing side of the liquid crystal cell, and a polarizing plate protective film wherein both Ro and Rt are virtually zero, is used on the backlight side, then the color shift and corner unevenness (namely light leakage) are reduced.

In the method disclosed in the Patent Document 1, in addition to the Ro and Rt being virtually zero, the physical properties of the film in the mechanical direction and direction perpendicular thereto, among others, the tensile modulus of elasticity, storage elastic modulus, photoelastic coefficient, and dimensional stability, are made equivalent in three directions. This arrangement is claimed to be very effective in minimizing light leakage particular due to ambient temperature and humidity.

However, the aforementioned techniques are not very effective in enhancing performance such as front contrast (meaning axis view contrast), as well as in reducing color shift and corner unevenness (namely light leaking). Thus, IPS liquid crystal display apparatus which does not use a retardation film on the viewing sides of the liquid crystal cell are available on the market in greater numbers.

In a known method of improving the color shift, a cellulose ester film wherein both Ro and Rt are virtually zero is used as a double polarizing plate protective film located between both polarizers, sandwiched in turn between them and a liquid crystal cell, without a retardation film being used, as shown in Non-Patent Document 1.

However, this method has been insufficient to meet all the requirements of reduced color shift, light leakage and front contrast.

The IPS and improved FFS (namely Fringe Field Switching) modes exhibit the problems that a specific black matrix of the pixel called "gritty feel" or "display unevenness" that cannot be observed in the VA (namely Vertical Alignment) or TN (namely Twisted Nematic) mode, and a feel of graininess resulting from minute transparent electrode patterns which are observed in the IPS and FFS.

[Patent Document 1] Unexamined Japanese Patent Application Publication No. 2006-18245

[Non-Patent Document 1] Hajime Nakayama et. al. (FUJI PHOTO FILM CO., LTD.) IDW/AD '05 pp. 1317-1320

[Non-Patent Document 2] Konica Technical Report Vol. 14, pp. 77-78 (2001)

SUMMARY OF THE INVENTION

Problems to be Solved by the Invention

An object of the present invention is to provide an IPS mode type liquid crystal display apparatus capable of meeting all the targeted requirements of color shift, corner unevenness and front contrast.

Means for Solving the Problems

The object of the present invention mentioned above can be achieved by the following structure:

(1) An IPS (In Plane Switching) mode type liquid crystal display apparatus comprising a liquid crystal cell, a first polarizing plates provided on a viewing side of the liquid crystal cell, and a second polarizing plate provided on a backlight light-source side of the liquid crystal cell, wherein the second polarizing plate comprising a polarizer, a first polarizing plate protective film provided on a liquid crystal cell side of the polarizer, a second polarizing plate protective film provided on a backlight light-source side, and the second polarizing plate protective film is a cellulose ester film having a film thickness of 20-50 μm, and Ro of the polarizing plate protective film of the second polarizing plate, Ro being expressed by the following Expression (i), satisfies the following relationship:

$$0\ \text{nm} \leq Ro \leq 2\ \text{nm}$$

following Expression (ii), satisfies the following relationship:

$$-5\ \text{nm} \leq Rt \leq 5\ \text{nm}$$

and in the second polarizing plate protective film, temperature fluctuation ΔRt (t) defined below satisfies the following relationship;

$$0\ \text{nm} \leq \Delta Rt(t) \leq 7\ \text{nm}$$

and humidity fluctuation ΔRt (h) defined below satisfies the following relationship;

$$0\ \text{nm} \leq \Delta Rt(h) \leq 20\ \text{nm}$$

wherein $$Ro = (nx - ny) \times d \qquad \text{Expression (i)}$$

$$Rt = [(nx + ny)/2 - nz] \times d \qquad \text{Expression (ii)}$$

wherein nx is a refractive index in the retardation axis direction in the film plane of the cellulose ester film, ny is a refractive index in the direction perpendicular to the retardation axis, nz is a refractive index in the film thickness direction, and d is a film thickness (nm);

temperature fluctuation ΔRt (t): difference between Rt value under the environment of 23° C. and 55% RH for 24 hours, and Rt value under the environment of 35° C. and 27% RH for 24 hours; and humidity fluctuation ΔRt (h): difference between Rt value under the environment of 23° C. and 20% RH for 24 hours, and Rt value under the environment of 23° C. and 80% RH for 24 hours.

EFFECTS OF THE INVENTION

The inventors found that, to overcome the aforementioned problems, the variation of Rt due to the temperature and humidity does not necessarily depend on the variation of Ro in the area wherein the Ro and Rt of the polarizing plate protective film on the backlight side are virtually zero, if the Ro value is below a predetermined level.

The inventors also found that, for light leakage in particular, the problem can be solved merely by a reduced percentage in the variation of Rt, without the polarizing plate protective film being physically requiring no change in temperature and humidity.

Therefore, since dependence on ΔRt is greater than dependence on ΔRo, the mechanical properties in the direction of the film surface and of film thickness are not necessarily equivalent, from the viewpoint of improvement of the properties cited as the above problems.

DESCRIPTION OF REFERENCE NUMERALS

Figure 1:
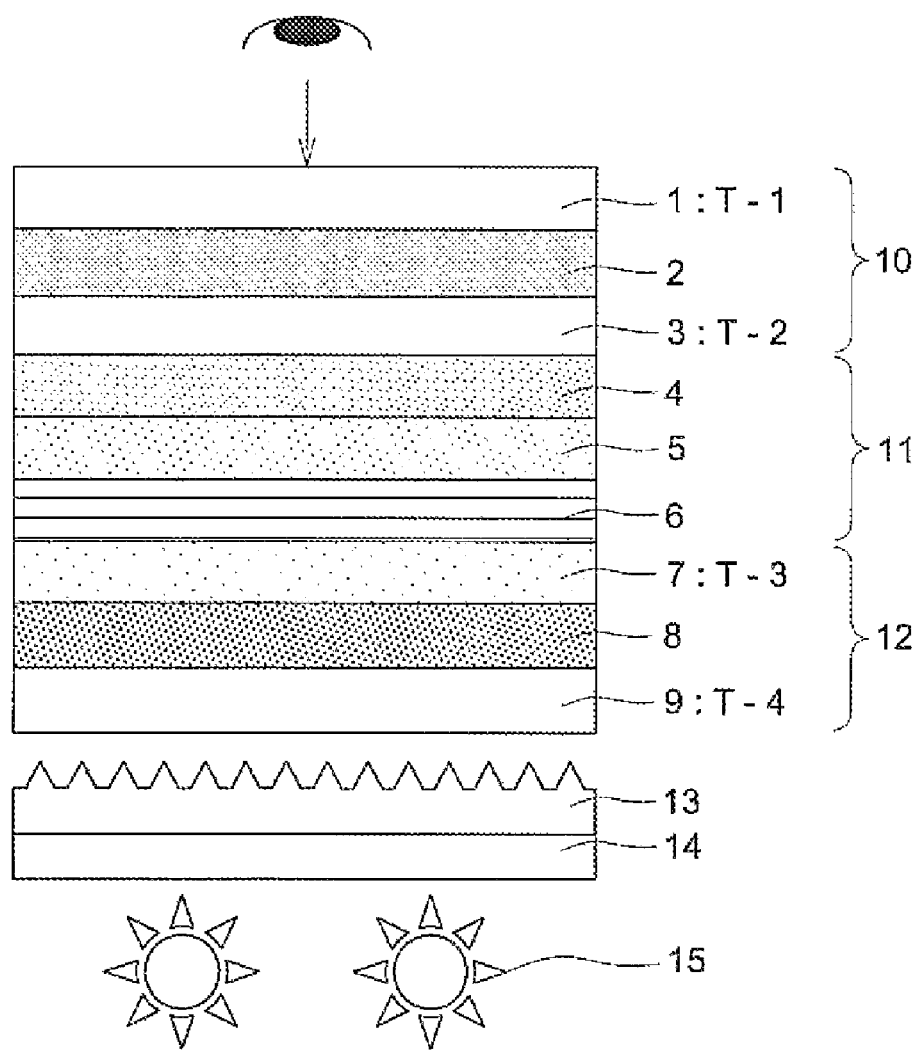
FIG. 1 is a schematic diagram showing the liquid crystal display apparatus in a preferable embodiment of the present invention.

1 Polarizing plate protective film T-1
2 Polarizer
3 Polarizing plate protective film T-2 on the non-electrode side
4 Cell-glass substrate on the non-electrode side
5 IPS type liquid crystal cell layer
6 Cell-glass substrate on the electrode side (being an electrode formed on the substrate)
7 Polarizing plate protective film T-3 on the electrode side
8 Polarizer
9 Polarizing plate protective film T-4
10 Polarizing plate on the non-electrode side
11 IPS type liquid crystal cell
12 Polarizing plate on the electrode side
13 Prismatic sheet
14 Light guide plate
15 Backlight

PREFERABLE EMBODIMENTS OF THE INVENTION

The following describes the details of the preferable embodiments of the present invention, but the present invention is not limited thereto.

In the liquid crystal display apparatus of this invention, the polarizing plate protective film, arranged on the liquid crystal cell side of the polarizing plate which is provided on the backlight light source side of the liquid crystal cell, is characterized in that Ro is $0 \leq Ro \leq 2$ nm, Rt is $-5 \leq Rt \leq 5$ nm and the film thickness is 20-50 μm.

The polarizing plate protective film at this position is preferably uniform as a film. For example, even if a plurality of films are laminated to produce a coating layer, and Ro and Rt is the same, a greater performance improvement effect can be produced in the case of one film (Rt and Ro).

In the present invention, Rt and Ro at 23° C. and 55% RH can be expressed by Formulas (1) and (2) at a wavelength of 590 nm.

$$Ro = (nx - ny) \times d \qquad \text{Formula (1)}$$

$$Rt = \{(nx + ny)/2 - nz\} \times d \qquad \text{Formula (2)}$$

wherein "nx" is a refractive index in the retardation axis direction in the film plane; "ny" is a refractive index in the direction perpendicular to the retardation axis; "nz" is a refractive index in the film thickness direction; and "d" is the film thickness (nm).

In this case, the double refraction and retardation value of the film can be measured by an automatic double refractometer (KOBRA-21ADH, manufactured by Oji Scientific Instruments) without being restricted thereto.

<Means for Achieving Ro and Rt>

In the polarizing plate protective film of this invention, to obtain Ro and Rt of the present invention, a proper type and quantity of the compounds characterized by negative orientation birefringence are selected, and Ro and Rt can be adjusted by these compounds being contained in the cellulose ester film at appropriate ratios.

<Cellulose Ester>

As a material to form the polarizing plate protective film of this film, utilized is cellulose ester, such as, triacetyl cellulose (TAC), diacetyl cellulose (DAC), cellulose acetate propionate (CAP), cellulose acetate butylate (CAB), cellulose acetate phthalate, cellulose acetate trimellitate, and cellulose nitrate.

There is no particular restriction to the cellulose as a material of the cellulose ester. It is exemplified by such as cotton linter, wood pulp and kenaf. The cellulose esters obtained from these materials can be used independently or as a mixture formed at an appropriate ratio, but 50% or more by mass of cotton linter is preferable.

If the molecular weight of the cellulose ester in the cellulose ester film is increased, the modulus of elasticity will also be increased. Excessive increase in the molecular weight will result in excessive viscosity of the cellulose ester solution, and hence poorer productivity. The cellulose ester molecular weight is preferably 30,000-200,000 in terms of the number average molecular weight (Mn), but more preferably 50,000-200,000.

In this invention, the cellulose ester preferably has an Mw/Mn ratio of 1-5, while more preferably 1-3, but still more preferably 1.4-2.3.

The average molecular weight and molecular weight distribution of the cellulose ester can be measured by high-speed liquid chromatography. This is used to calculate the number average molecular weight (Mn) and mass average molecular weight (Mw), and also the ratio thereof.

The following describes the measuring conditions:
Solvent: Methylene chloride
Column: Shodex K806, K805 and K803G (manufactured by Showa Denko K.K.: three columns are connected)
Column temperature: 25° C.
Sample density: 0.1% by mass
Detector: RI Model 504 (manufactured by GL Science Co., Ltd.)
Pump: L6000 (manufactured by Hitachi, Ltd.)
Flow rate: 1.0 ml/min
Calibration curve: Using a Standard polystyrene STK (standard polystyrene, produced by Tosoh Corporation), Calibration Curves were provided based on 13 samples of Mw=1,000,000–500. These 13 samples were preferably used at an almost equally spaced interval.

The particularly preferred cellulose ester has a substituent of acyl group containing 2-4 carbon atoms. It is a cellulose ester which meets both following Formulas (I) and (II), assuming that the replacement ratio of acetyl group is Xac, and that of the propionyl group or butyryl group is Ypb.

$$2.2 < (Xac+Ypb) \leq 2.95 \qquad \text{Formula (I)}$$

$$0 < Xac \leq 2.95 \qquad \text{Formula (II)}$$

The replacement ratio of these acyl groups can be measured via the method defined in ASTM-D817-96. The portion not replaced by the acyl group is normally present as a hydroxyl group. These cellulose esters can be synthesized by commonly known methods.

<Negative Orientation Birefringence Compound>

In this invention, a negative orientation birefringence compound refers to a negative birefringence material in the direction of orientation of a polarizing plate protective film. It is exemplified by acryl polymer, polyester, a compound containing a furanose structure or pyranose structure, sulfone compound, and needle-shaped particle.

Whether the property of negative orientation birefringence is contained or not can be confirmed by using a double refractometer to measure birefringence of the film in a system, other than the system having the compound added thereto, and by comparing the differences thereof.

<Acryl Polymer, Polyester, and Compound Containing a Furanose Structure or a Pyranose Structure>

The following describes an acryl polymer, a polyester, and a compound containing a furanose structure or a pyranose structure in the present invention:

<Acryl Polymer>

The cellulose ester film utilized in the present invention preferably contains an acryl polymer exhibiting negative orientation birefringence wherein the weight average molecular weight is 500 or more, but not exceeding 30,000. This acryl polymer is preferably an acryl polymer having, on a side chain, an acryl polymer or cyclohexyl group that has an aromatic ring on the side chain.

Compatibility between the cellulose ester and the above polymer can be enhanced by controlling the composition of the polymer having a weight average molecular weight of 500 or more, but not exceeding 30,000.

Specifically, if an acryl polymer having an aromatic ring in its side chain, and an acryl polymer having a cyclohexyl group in the side chain, preferably have a weight average molecular weight of 500 or more, but not exceeding 10,000, it is possible to provide excellent transparency of the cellulose ester film subsequent to film production, superb moisture permeability, and excellent performance as a protective film for a polarizing plate, in addition to the above advantages.

This polymer has a weight average molecular weight of 500 or more, but not exceeding 30,000, and the weight is assumed to be between an oligomer and a low molecular weight polymer. To synthesize such a polymer, the molecular weight cannot be easily controlled by conventional methods of polymerization. It is preferred to use a method which assures uniform molecular weight without requiring excessive molecular weight.

Such a polymerization method includes one using a peroxide polymerization initiator such as cumene peroxide or t-butylhydroperoxide; a method using a greater amount of polymerization initiator than conventional polymerization; a method using a chain-transfer agent such as a mercapto compound and carbon tetrachloride, in addition to the polymerization initiator; a method of using a polymerization terminator such as benzoquinone and dinitrobenzene in addition to the polymerization initiator; and a bulk polymerization method using a compound containing one thiol group and secondary hydroxyl group and/or a polymerization catalyst making a concurrent use of this compound and an organic metallic compound, as disclosed in the Unexamined Japanese Patent Application Publication No. 2000-128911 or 2000-344823. Any of these methods may be preferably utilized in the present invention. Specifically, the method disclosed in the above Unexamined Japanese Patent Application Publication is preferably used.

The following describes the monomer as a monomer unit useful in the present invention, without the present invention being restricted thereto.

The ethylenic unsaturated monomer unit constituting the polymer obtained by polymerization of the ethylenic unsaturated monomer is exemplified by: a vinyl ester such as acetic acid vinyl, propionic acid vinyl, vinyl butyrate, vinyl valerate, vinyl pivalate, vinyl caproate, vinyl caproate, vinyl laurate, vinyl myristate, palmitic acid vinyl, vinyl stearate, vinyl cyclohexacarboxylate, vinyl octoate, vinyl methacrylate, vinyl crotonate, vinyl sorbate, vinyl benzoate, and vinyl cinnamate; an acrylic acid ester such as methyl acrylate, ethylacrylate, (i-, n-)propyl acrylate, (n-, i-, s-, t-)butyl acrylate, (n-, i-, s-)pentyl acrylate, (n-, i-)hexyl acrylate, (n-, i-)acrylic acid heptyl acrylate, (n-, i-)octyl acrylate, (n-, i-)nonyl acrylate, (n-, i-)myristyl acrylate, cyclohexyl acrylate, (2-ethylhexyl) acrylate, benzyl acrylate, phenethyl acrylate, (ε-caprolactone) acrylate, (2-hydroxy ethyl)acrylate, (2-hydroxy propyl)acrylate, (3-hydroxy propyl)acrylate, (4-hydroxy butyl)acrylate, (2-hydroxy butyl)acrylate, p-hydroxy methylphenyl acrylate, and p-(2-hydroxy ethyl)phenyl acrylate; a methacrylic acid ester wherein the aforementioned acrylic acid ester is replaced by methacrylic acid ester; and an unsaturated acid such as acrylic acid, methacrylic acid, anhydrous maleic acid, crotonic acid, and itaconic acid.

The polymer made up of the above monomer may be either a copolymer or a homopolymer. A vinyl ester homopolymer, a vinyl ester copolymer, a copolymer between vinyl ester and acrylic acid or methacrylic acid ester, are preferable.

In the present invention, the acryl polymer (hereinafter, simply called "acryl polymer") refers to the homopolymer or copolymer of acrylic acid or methacrylic acid alkyl ester that does not contain a monomer unit provided with an aromatic ring or cyclohexyl group. The acryl polymer having an aromatic ring on the side chain basically refers to an acryl polymer containing an acrylic acid or a methacrylic acid ester monomer unit further containing an aromatic ring.

Further, the acryl polymer having a cyclohexyl group on the side chain refers to a acryl polymer containing an acrylic acid or methacrylic acid ester monomer unit including a cyclohexyl group.

Examples of the acrylic acid ester monomer which do not contain an aromatic ring and cyclohexyl group include methylacrylate, ethylacrylate, propylacrylate (i-, n-), butylacrylate (n-, i-, s-, t-), pentylacrylate (n-, i-, s-), hexylacrylate (n-, i-), heptylacrylate (n-, i-), octylacrylate (n-, i-), nonylacrylate (n-, i-), myristylacrylate (n-, i-), (2-ethylhexyl) acrylate, (ε-caprolactone)acrylate, (2-hydroxy ethyl)acrylate, (2-hydroxy propyl)acrylate, (3-hydroxy propyl)acrylate, (4-hydroxy butyl)acrylate, (2-hydroxy butyl)acrylate, (2-methoxyethyl)acrylate, (2-ethoxyethyl) acrylate, and the above acrylic acid ester replaced by methacrylic acid ester.

The acryl polymer is the homopolymer or copolymer of the above monomer. Thirty percent or more by mass of methyl acrylate ester monomer unit is preferably contained, and 40% or more by mass of methacrylic acid methyl ester monomer unit is more preferably contained. The homopolymer of methyl acrylate or methacrylic acid methyl is specifically preferred.

Examples of the acrylic acid or methacrylic acid ester monomer containing an aromatic ring include; phenyl acrylate, phenyl methacrylate, (2- or 4-chlorophenyl) acrylate, (2- or 4-chlorophenyl)methacrylate, (2-, 3- or 4-ethoxycarbonyl phenyl)acrylate, (2-, 3- or 4-ethoxycarbonyl phenyl)methacrylate, acrylic acid (o-, m- or p-tolyl), (o-, m- or p-tolyl), benzyl acrylate, benzyl methacrylate, phenethyl acrylate, phenethyl methacrylate, and (2-naphthyl)acrylate, of which the benzyl acrylate, benzyl methacrylate, phenethyl acrylate and phenethyl methacrylate are preferable.

The acryl polymer having an aromatic ring on the side chain preferably contains 20-40% by mass of the acrylic acid or methacrylic acid ester monomer unit also containing an aromatic ring, and 50-80% by mass of the acrylic acid or methacrylic acid methyl ester monomer unit. This polymer preferably contains 2-20% by mass of the acrylic acid or methacrylic acid ester monomer unit containing a hydroxyl group.

Examples of acrylic acid ester monomer containing the cyclohexyl group include: cyclohexyl acrylate, cyclohexyl methacrylate, (4-methylcyclohexyl)acrylate, (4-methylcyclohexyl)methacrylate, (4-ethylcyclohexyl)acrylate, (4-ethylcyclohexyl)methacrylate, and cyclohexyl acrylate, of which cyclohexyl methacrylate is preferable.

The acryl polymer with a cyclohexyl group on the side chain preferably contains 20-40% by mass of acrylic acid or methacrylic acid ester monomer unit containing a cyclohexyl group, and 50-80% by mass of the acrylic acid or methacrylic acid methyl ester monomer unit. Further, this polymer preferably contains 2-20% by mass of acrylic acid or methacrylic acid ester monomer unit having a hydroxyl group.

The polymer and acryl polymer obtained by polymerization of the above ethylenic unsaturated monomer, the acryl polymer with an aromatic ring on the side chain, and the acryl polymer with a cyclohexyl group on the side chain are all characterized by excellent compatibility with a cellulose resin.

The acrylic acid or methacrylic acid ester monomer containing the hydroxyl group is based on a copolymer composition unit, not a homopolymer composition unit. In this case, 2-20% by mass of the acrylic acid or methacrylic acid ester monomer unit containing the hydroxyl group is preferably included in the acryl polymer.

In this invention, preferably utilized is a polymer containing a hydroxyl group on the side chain. The monomer unit containing a hydroxyl group is the same as the aforementioned monomer, but the acrylic acid or methacrylic acid ester is preferred, of which the preferred examples are: (2-hydroxy ethyl)acrylate, (2-hydroxy propyl)acrylate, (3-hydroxy propyl)acrylate, (4-hydroxy butyl)acrylate, (2-hydroxy butyl) acrylate, p-hydroxy methylphenyl acrylate, and p-(2-hydroxy ethyl) phenyl acrylate, and similar compounds wherein "acrylate" is replaced with "methacrylate". The above 2-hydroxyethyl acrylate and 2-hydroxyethyl methacrylate are preferably used. The polymer preferably contains 2-20% by mass of the acrylic acid ester or methacrylic acid ester monomer unit containing a hydroxyl group, but more preferably 2-10% by mass.

Needless to say, the aforementioned polymer containing 2-20% by mass of the monomer unit containing the above hydroxyl group is characterized by excellent compatibility with the cellulose ester, retentivity, and dimensional stability. Not only that, such a polymer is further characterized by reduced moisture permeability, excellent adhesion to a polarizer as a polarizing plate protective film, which enhances durability of the polarizing plate.

There is no specific limitation to the method wherein at least one of the terminals of the main chain of the acryl polymer is provided with a hydroxyl group, if the terminal of the main chain in particular has a hydroxyl group. It is possible to employ a method of using a radial polymerization initiator containing a hydroxyl group such as azobis(2-hydroxy ethylbutylate); a method of using a chain-transfer agent containing a hydroxyl group such as 2-mercaptoethanol; a method of using a polymerization terminator containing a hydroxyl group; a method of having a hydroxyl group on the terminal via living ion polymerization; or a method of bulk polymerization using a compound containing one thiol group and a secondary hydroxyl group, or a polymerization catalyst making concurrent use of this compound and an organic metallic compound, as disclosed in Unexamined Japanese Patent Application Publication No. 2000-128911 or 2000-344823. The methods disclosed in these publications are specifically preferred.

The polymer having a hydroxyl group on the terminal of the above and/or the polymer having a hydroxyl group on the side chain provides remarkable enhancement of polymer compatibility and transparency in the present invention.

Further, a polymer using styrene is usable as the ethylenic unsaturated monomer exhibiting negative orientation birefringence to drawn direction. This is preferable in that it exhibits negative birefringence. Examples of styrene include styrene itself, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, and methyl vinyl benzoate ester, without being restricted thereto.

The monomer may be copolymerized with the monomers cited as the above unsaturated ethylenic monomer, or may be mixed with the cellulose ester using two or more of the above polymers for the purpose of controlling birefringency.

Further, the cellulose ester film utilized in the present invention preferably contains:

polymer X obtained by copolymerization between ethylenic unsaturated monomer Xa without an aromatic ring and the hydrophilic group contained inside of the molecule, and the ethylenic unsaturated monomer Xb containing a hydrophilic group but not an aromatic ring in the molecule wherein the polymer X has a weight average molecular weight of 5,000 or more without exceeding 30,000; and polymer Y obtained by polarization of ethylenic unsaturated monomer Ya, more preferably, without containing an aromatic ring wherein this polymer Y has a weight average molecular weight 500 or more without exceeding 3,000.

<Polymer X and Polymer Y>

Polymer X is a polymer obtained by copolymerization of ethylenic unsaturated monomer Xa without an aromatic ring and the hydrophilic group contained inside the molecule, and the ethylenic unsaturated monomer Xb containing a hydrophilic group but not an aromatic ring in the molecule, wherein this polymer X has a weight average molecular weight of 5,000 or more but not exceeding 30,000. Preferably, Xa is an acryl or a methacryl monomer without an aromatic ring or a hydrophilic group contained in the molecule, and Xb is an acryl or a methacryl monomer containing a hydrophilic group but not an aromatic ring in the molecule.

Polymer X is expressed by the following Formula (1):

—(Xa)m-(Xb)n-(Xc)p-                           Formula (1)

More preferably, polymer X of the present invention is expressed by the following Formula (1-1):

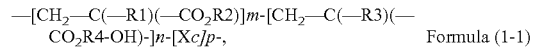

—[CH$_2$—C(—R1)(—CO$_2$R2)]m-[CH$_2$—C(—R3)(—CO$_2$R4-OH)-]n-[Xc]p-,          Formula (1-1)

In the formula, R1, R3, and R5 are H or $CH_3$. R2 is an alkyl group or a cycloalkyl group having 1-12 carbon atoms. R4 and R6 are —$CH_2$—, —$C_2H_4$—, or —$C_3H_6$—. Xc is a monomer unit polymerizable with above Xa and Xb. "m", "n", and "p" are mole composition ratios. Herein, m and n are never 0, and m+n+p=100. The monomer as the monomer unit constituting polymer X is exemplified below, without being restricted thereto.

In X, the hydrophilic group refers to a group containing a hydroxyl group or an ethylene oxide chain.

Above ethylenic unsaturated monomer Xa without an aromatic ring or a hydrophilic group contained in the molecule is exemplified by: methylacrylate; ethylacrylate; propyl acrylate (i-, n-); butylacrylate (n-, i-, s-, t-); pentylacrylate (n-, i-, s-); hexylacrylate (n-, i-); heptyl acrylate (n-, i-); octyl acrylate (n-, i-); nonylacrylate (n-, i-); myristylacrylate (n-, i-); (2-ethylhexyl)acrylate; (ε-caprolactone)acrylate; (2-ethoxyethyl)acrylate; or those, wherein the above acrylic acid ester is replaced with methacrylic acid ester. Of these, methyl acrylate, ethyl acrylate, methyl methacrylate, ethyl methacrylate, and propyl methacrylate (i-, n-), are specifically preferred.

Ethylenic unsaturated monomer Xb containing a hydrophilic group but not an aromatic ring in the molecule is preferably an acrylic acid or a methacrylic acid ester as a monomer unit containing the above hydroxyl group. Examples of such include: (2-hydroxyethyl)acrylate, (2-hydroxypropyl) acrylate, (3-hydroxypropyl)acrylate, (4-hydroxybutyl) acrylate, (2-hydroxybutyl)acrylate, and those wherein the acrylate is replaced with the methacrylate. The preferred examples are (2-hydroxyethyl)acrylate, (2-hydroxyethyl) methacrylate, (2-hydroxypropyl)acrylate and (3-hydroxypropyl)acrylate.

There is no particular restriction to Xc if it is a copolymerizable ethylenic unsaturated monomer other than Xa and Xb, however, it is preferred not to contain an aromatic ring.

Mole composition ratio m:n of Xa, Xb and Xc is preferably in the range of 99:1-65:35, but is more preferably in the range of 95:5-75:25. "p" of Xc is typically in the range of 0-10. It is allowed that Xc is a plurality of monomer units.

If the mole composition ratio of Xa is excessively high, compatibility with cellulose ester tends to be improved, however, retardation value Rt of film thickness direction will increase. If the mole composition ratio of Xb is excessively high, compatibility with cellulose ester tends to be deteriorated, however, the retardation value Rt will decrease. Further, if the mole composition ratio of Xb exceeds the above range, haze tends to appear on the film at the time of film production. It is preferred that these conditions are optimized to determine the mole composition ratio of the Xa and Xb.

The molecular weight of polymer X has a weight average molecular weight of 5,000 or more but not exceeding 30,000, but more preferably 8,000 or more but not exceeding 25,000.

When the weight average molecular weight is 5,000 or more, it enables a cellulose ester film characterized by minimum dimensional variation under conditions of high temperature and high humidity, and a polarizing plate protective film characterized by negligible curling. When the weight average molecular weight is kept below 30,000, compatibility with cellulose ester is enhanced, while bleed-out under conditions of high temperature and high humidity, and further haze immediately after film production can be reduced.

The weight average molecular weight of polymer X can be adjusted by any conventionally known molecular weight adjusting method. An example of a molecular weight adjusting method is to add a chain-transfer agent, such as carbon tetrachloride, lauryl mercaptan, and octyl thioglycolate. Further, the polymerization temperature is normally in the range of room temperature to 130° C., preferably 50° C. to 100° C. The molecular weight can be adjusted by changing this temperature or polymerization reaction time.

The following describes the method of measuring the weight average molecular weight.

(Weight Average Molecular Weight Measuring Method)

The weight average molecular weight Mw is measured by gel permeation chromatography.

The following describes the conditions for measurement:

Solvent: Methylene chloride

Column: Shodex K806, K805 and K803G (produced by Showa Denko K. K.: three columns are connected)

Column temperature: 25° C.

Sample density: 0.1% by mass

Detector: RI Model 504 (manufactured by GL Science Co., Ltd.)

Pump: L6000 (manufactured by Hitachi, Ltd.)

Flow rate: 1.0 mL/min

Calibration curve: Standard Polystyrene STK (Standard polystyrene produced by Tosoh Corporation): Calibration curves based on 13 samples of Mw=1,000,000–500 are used. These 13 samples are used at an almost equally spaced interval.

Polymer Y is a polymer having a weight average molecular weight 500 or more but not exceeding 3,000 obtained by polymerization ethylenic unsaturated monomer Ya without containing an aromatic ring.

When the weight average molecular weight of polymer Y is 500 or more, the residual monomer of polymer is preferably reduced. Further, when it does not exceed 3,000, the performance of reducing retardation value Rt is preferably maintained.

Ya is preferably an acryl or a methacryl monomer without containing an aromatic ring.

Polymer Y is expressed by following Formula (2).

$$-(Ya)k\text{-}(Yb)q-\qquad\text{Formula (2)}$$

More preferably, polymer Y of the present invention is expressed by following Formula (2-1):

$$-[CH_2-C(-R5)(-CO_2R6)]k\text{-}[Yb]q-\qquad\text{Formula (2-1)}$$

In the formula, R5 is H or $CH_3$, and R6 is an alkyl group or a cycloalkyl group having 1-12 carbon atoms. Yb is a monomer unit copolymerizable with Ya. "k" and "q" are mole composition ratios, wherein k≠0 and k+q=100.

There is no particular restriction to Yb, as long as it is an ethylenic unsaturated monomer copolymerizable with Yb. The number of Yb's may be more than one. k+q=100, and q is preferably in the range of 0-30.

Ethylenic unsaturated monomer Ya constituting polymer Y obtained by polymerization of the ethylenic unsaturated monomer without an aromatic ring is exemplified by: an acrylic acid ester such as methyl acrylate; ethyl acrylate; propyl acrylate (i-, n-); butyl acrylate (n-, i-, s-, t-); pentyl acrylate (n-, i-, s-); hexyl acrylate (n-, i-); heptyl acrylate (n-, i-); octyl acrylate (n-, i-); nonyl acrylate (n-, i-); myristyl acrylate (n-, i-); cyclohexyl acrylate; (2-ethylhexyl)acrylate; (ε-caprolactone)acrylate; (2-hydroxy ethyl)acrylate, (2-hydroxy propyl)acrylate; (3-hydroxy propyl)acrylate; (4-hydroxy butyl)acrylate; and (2-hydroxy butyl)acrylate; a methacrylic acid ester wherein the above acrylate is replaced with a methacrylate; and an unsaturated acid such as acrylic acid, methacrylic acid, anhydrous maleic acid, crotonic acid, and itaconic acid.

There is no particular restriction to Yb, as long as it is an ethylenic unsaturated monomer copolymerizable with Yb.

The preferred examples of the vinyl ester include vinyl acetate, vinyl propionate, vinyl butyrate, vinyl valerate, vinyl pivalate, vinyl caproate, vinyl caproate, vinyl laurate, vinyl myristate, vinyl palmitate, vinyl stearate, vinyl cyclohexanecarboxylate, vinyl octylate, vinyl methacrylate, vinyl crotonate, vinyl sorbate and vinyl cinnamate. The number of Yb's may be more than one.

To synthesize polymers X and Y, a conventional polymerization is not sufficient to control the molecular weight. It is preferred to use a method wherein the uniform molecular weight can be achieved without the molecular weight being excessively increased. Such a polymerization method is exemplified by: a method of using a peroxide polymerization initiator such as cumene peroxide or t-butylhydroperoxide; a method of using a greater amount of polymerization initiator than in the conventional polymerization technique; a method of using a chain-transfer agent such as a mercapto compound and carbon tetrachloride in addition to the polymerization initiator; a method of using a polymerization terminator such as a benzoquinone and dinitrobenzene in addition to the polymerization initiator; and a method of bulk polymerization using a compound containing one thiol group and a secondary hydroxyl group or a polymerization catalyst making concurrent use of this compound and organic metallic compound, as disclosed in the Unexamined Japanese Patent Application Publication No. 2000-128911 or 2000-344823. Any of these methods can be used preferably. Especially preferable is the method of polymerization using a compound containing a thiol group and a secondary hydroxyl group in the molecule as a chain-transfer agent.

In this case, the terminals of polymer X and polymer Y contain the hydroxyl group and thio ether derived from a polymerization catalyst and a chain-transfer agent. Compatibility between polymers X and Y, and cellulose ester may be adjusted by this terminal residual group.

The hydroxyl value of polymer X and Y is preferably 30-150 [mg KOH/g].

(Measurement Method of Hydroxyl Value)

This measurement is based on JIS K 0070 (1992). This hydroxyl value is defined as a mg number of potassium hydroxide which is required to neutralize acetic acid bonding to a hydroxyl group when 1 g of a sample is acetylated. Specifically, X g (approximately 1 g) of a sample is precisely weighed in a flask, which is supplied with exactly 20 ml of an acetylation agent (20 ml of acetic anhydride is supplied pyridine to make 400 ml). The flask is equipped with an air condenser at the mouth and the mixture is heated in a glycerin bath of 95-100° C.

After 1 hour and 30 minutes, the mixture is cooled and is supplied with 1 ml of pure water through the air condenser to decompose acetic anhydride into acetic acid. Next, titration with a 0.5 mol/L ethanol solution of potassium hydroxide is performed via a potentiometric titrator to determine the inflection point of the obtained titration curve as an end point. Further, as a blank test, titration without a sample is performed to determine the inflection point of a titration curve.

A hydroxyl value is calculated by the following equation.

Hydroxyl value=[($B-C$)×$f$×28.05/$X$]+$D$

In the equation, B is quantity (ml) of a 0.5 mol/L ethanol solution of potassium hydroxide utilized for a blank test, C is quantity (ml) of a 0.5 mol/L ethanol solution of potassium hydroxide utilized for titration, f is a factor of a 0.5 mol/L ethanol solution of potassium hydroxide, D is an acid value, and 28.05 is ½ of molar quantity 56.11 of potassium hydroxide.

Both of Polymer X and Polymer Y described above exhibit excellent compatibility with cellulose ester, excellent productivity without evaporation or vaporization, good reservability, small moisture permeability and excellent dimensional stability, as a polarizing plate protective film.

The content of polymer X and Polymer Y in a cellulose ester film is preferably in a range to satisfy following equations (iii) and (iv). When a content of polymer X is X g, [% by mass=(mass of polymer X/mass of cellulose ester)×100] and a content of Polymer Y is Y g (% by mass)], $5 \leq Xg+Yg \leq 35$(% by mass)   Equation (iii)

$0.05 \leq Yg/(Xg+Yg) \leq 0.4$   Equation (iv)

The preferable range of equation (iii) is 10-25% by mass.

When the total amount of polymer X and polymer Y is not less than 5% by mass, a sufficient effect to decrease retardation value Rt can be achieved. Further, when the total amount is not more than 35% by mass, adhesion to a polarizer PVA will be enhanced.

Polymer X and polymer Y can be directly added and dissolved as materials to constitute a dope solution which will be described later, or can be added into a dope solution after having been dissolved in an organic solvent to dissolve cellulose ester in advance.

<Polyester>

The cellulose ester film utilized in the present invention preferably incorporates the following polyester:

(Polyester represented by Formula (3) or (4))

The cellulose ester film of the present invention preferably incorporates the polyester represented by following Formula (3) or (4):

B1-(G-A-)$m$G-B1   General Formula (3)

wherein B1 is monocarboxylic acid, C is divalent alcohol and A is dibasic acid. None of B1, G and A contains an aromatic ring. "m" is a repeating number.

B2-(A-G-)$n$A-B2   General Formula (4)

wherein B2 is monoalcohol, G is divalent alcohol and A is dibasic acid. None of B2, G and A contains an aromatic ring. "n" is a repeating number.

In Formulas (3) and (4), B1 is a monocarboxylic acid component, B2 is a monoalcohol component, G is a divalent alcohol component, and A is a dibasic acid component. These components are used for synthesis. None of B1, B2, G and A is characterized by the absence of an aromatic ring. "m" and "n" are repeating numbers.

There is no particular restriction to the monocarboxylic acid represented by B1. The conventionally known aliphatic monocarboxylic acid, alicyclic monocarboxylic acid and others can be used.

The following describes the preferred examples of the monocarboxylic acid without being restricted thereto:

The fatty acid provided with a straight chain or a side chain and having 1-32 carbon atoms can be used preferably as aliphatic monocarboxylic acid. In this case, the number of carbon atoms is more preferably 1-20, still more preferably 1-12. The acetic acid is preferably incorporated because compatibility with cellulose ester is improved. It is also preferred to utilize a mixture of acetic acid with other monocarboxylic acid.

Preferable examples of the aliphatic monocarboxylic acid include:

saturated fatty acid such as formic acid, acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenoic acid, oleic acid, sorbic acid, linoleic acid, linolenic acid and arachidic acid.

There is no particular restriction to the monoalcohol component represented by B2. Alcohols well known in the art can be utilized. For example, aliphatic saturated alcohol or aliphatic unsaturated alcohol provided with straight chain or side chain and having 1-32 carbon atoms can be preferably utilized The number of carbons is more preferably 1-20, and still more preferably 1-12.

A divalent alcohol component represented by G includes the following examples, without the present invention being restricted thereto: These examples are ethylene glycol, diethylene glycol, 1,2-propylene glycol, 1,3-propylene glycol, 1,2-butylene glycol, 1,3-butylene glycol, 1,4-butylene glycol, 1,5-pentanediol, 1,6-hexanediol, 1,5-pentylene glycol, diethylene glycol, triethylene glycol and tetraethylene glycol. Among them, ethylene glycol, 1,2-propylene glycol, 1,3-propylene glycol, 1,2-butylene glycol, 1,3-butylene glycol, 1,4-butylene glycol, 1,6-hexanediol, diethylene glycol and triethylene glycol are preferable. Further, 1,3-propylene glycol, 1,4-butylene glycol, 1,6-hexanediol and diethylene glycol are also preferably utilized.

Preferred examples of the dibasic acid (dicarboxylic acid) component represented by A include aliphatic dibasic acid and alicyclic dibasic acid. The aliphatic dibasic acid is exemplified by malonic acid, succinic acid, glutaric acid, adipic acid, pimelic acid, suberic acid, azelaic acid, sebacic acid, undecane dicarboxylic acid and dodecane dicarboxylic acid. Specifically, the component having 4-12 carbons, or at least one selected therefrom is used as aliphatic dicarboxylic acid. That is, two or more dibasic acids can be utilized in combination.

m and n are repeating numbers and are preferably 1 or more without exceeding 170.

(Polyester Represented by General Formula (5) or (6))

The cellulose ester film preferably contains the polyester represented by Formula (5) or (6):

B11-(G1-A1-)m1G1-B11    Formula (5)

wherein B11 is a monocarboxylic acid containing 1-12 carbon atoms, G1 is a divalent alcohol containing 2-12 carbon atoms, and A1 is a dibasic acid containing 2-12 carbon atoms. None of B11, G1 and A1 contains an aromatic ring. "m1" is a repeating number.

B21-(1-G1-)n1A1-B21    Formula (6)

wherein B21 is a monoalcohol containing 1-12 carbon atoms, G1 is a divalent alcohol containing 2-12 carbon atoms and A1 is a dibasic acid containing 2-12 carbon atoms. None of B21, G1 and A1 contains an aromatic ring. "n1" is a repeating number.

In Formulas (5) or (6), B11 is a monocarboxylic acid component containing 1-12 carbon atoms, B21 is a monoalcohol component containing 1-12 carbon atoms, G1 is a divalent alcohol component containing 2-12 carbon atoms, and A1 is a dibasic acid component containing 2-12 carbon atoms. These components are used for synthesis. None of B11, G1 and A1 is characterized by the absence of an aromatic ring. "m1" and "n1" are repeating numbers.

B11 is a monocarboxylic acid containing 1-12 carbon atoms and synonymous with B1 in Formula (3), and B21 is a monoalcohol containing 1-12 carbon atoms and synonymous with B2 in Formula (4).

G1 and A1 are alcohol components or dibasic acid components containing 2-12 carbon atoms in G and A of aforementioned Formula (3) or (4).

The weight average molecular weight of the polyester is preferably 20,000 or less, more preferably 10,000 or less. Especially the polyester having a weight average molecular weight of 500-10,000 is preferably used for its excellent compatibility with cellulose ester.

A normal method is used for polycondensation of the polyester. For example, synthesis can be easily achieved by either the hot melting condensation method by direction reaction between the aforementioned dibasic acid and glycol; or esterification reaction or ester replacement reaction between the aforementioned dibasic acid or the alkyl esters thereof (e.g., methyl ester of dibasic acid) and glycols; or the method by dehalogenated hydrogen reaction between the chlorides of these acids and glycol. Polyester prefers the direct reaction method wherein the weight average molecular weight is not excessively increased.

The polyester having thicker distribution on the low molecular weight side provides excellent compatibility with cellulose ester. This arrangement yields a cellulose ester film characterized by reduced moisture permeability and excellent transparency after film formation. There is no particular restriction to the molecular weight adjusting method. The conventional method can be used. For example, this adjustment can be made by sequestering the molecule terminal with monovalent acid or monovalent alcohol, or by adjusting the added weight of the monovalent acid or alcohol, although it depends on polymerization conditions.

In this case, the monovalent acid is preferably used for its polymer stability. Acetic acid, propionic acid, and butyric acid can be mentioned as examples. Selection is made of those which are not evaporated out of the system during condensed polymerization but can be easily evaporated out of the system when the reaction is stopped and such a monovalent acid is removed out of the system. These may be utilized as a mixture. Further, in the case of a direct reaction, the weight average molecular weight can be controlled also by judging the timing to stop the reaction based on the quantity of water evaporated out during the reaction. In addition, the molecular weight control is possible also by biasing a mol number of glycol or dibasic acid which are charged, as well as by controlling the reaction temperature.

Preferably 1-40% by mass of the polyester according to the present invention is contained in the cellulose ester. More preferably 2-30% by mass, still more preferably 5-15% by mass, of the polyester expressed by Formula (5) or (6) is contained therein.

<Compound Containing a Furanose Structure or a Pyranose Structure>

The cellulose ester film utilized in the present invention preferably contains a compound wherein all or part of the OH groups in a compound which includes at least one furanose structure or pyranose structure and which is made up of bonding of 1-12 such furanose structures or pyranose structures are esterified.

The following shows examples of the preferable "compound which includes at least one furanose structure or pyranose structure and which is made up of bonding of 1-12 such furanose structures or pyranose structures", but the present invention is not limited to these examples.

These examples include glucose, galactose, mannose, fructose, xylose, arabinose, lactose, sucrose, cellobiose, cellotriose, maltotriose and raffinose. Those containing both the furanose structure and pyranose structure are specifically preferred. Sucrose is cited as an example.

There is no particular restriction to the monocarboxylic acid used in the "compound which includes at least one furanose structure or pyranose structure and which is made up of bonding of 1-12 such furanose structures or pyranose structures". The conventionally known aliphatic monocarboxylic acid, alicyclic monocarboxylic acid, and aromatic monocarboxylic acid can be used. One carboxylic acid or a mixture of two or more carboxylic acids can be used.

Preferable aliphatic monocarboxylic acid includes saturated fatty acid such as acetic acid, propionic acid, butyric acid, isobutyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenoic acid, oleic acid, sorbic acid, linoleic acid, linolenic acid, arachidic acid and octenoic acid.

Preferable examples of alicyclic monocarboxylic acid include cyclopentane carboxylic acid, cyclohexane carboxylic acid and cyclooctane carboxylic acid; or derivatives thereof.

Preferable examples of an aromatic monocarboxylic acid include the aromatic monocarboxylic acid in which an alkyl group or an alkoxy group is introduced in a benzene ring of benzoic acid such as benzoic acid and toluic acid; and aromatic monocarboxylic acid having at least two benzene rings such as cinnamic acid, benzilic acid, biphenyl carboxylic acid, naphthalene carboxylic acid and tetralin carboxylic acid; or derivatives thereof. Benzoic acid is specifically preferable.

The details of the method for producing these compounds are given in the Unexamined Japanese Patent Application Publication Nos. S62-42996 and H10-237084.

The following describes the specific examples, without the present invention being restricted thereto:

Compound (1)
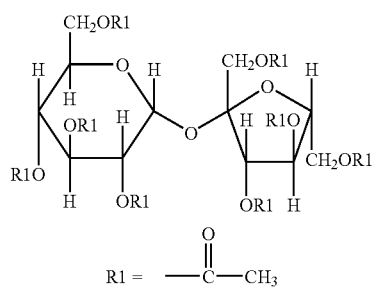

Compound (2)
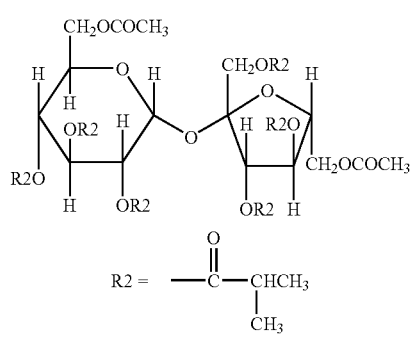

Compound (3)
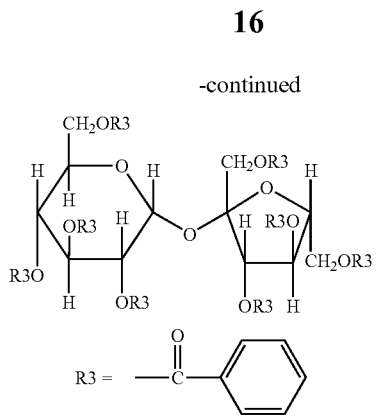

Compound (4)
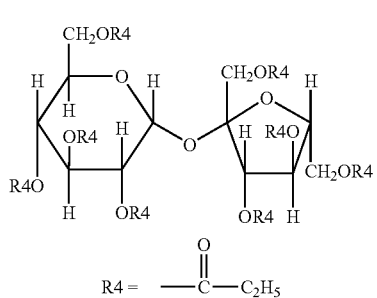

Compound (5)
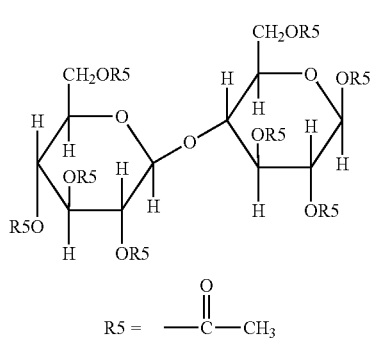

Compound (6)
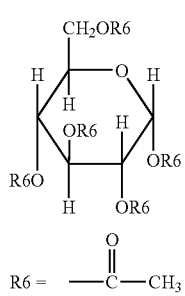

Compound (7)
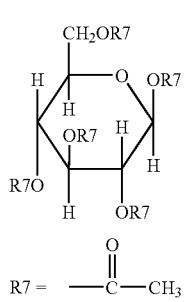

-continued

Compound (8)
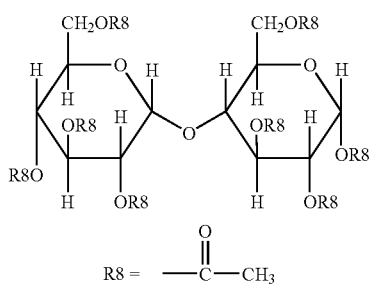
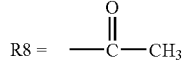

Compound (9)
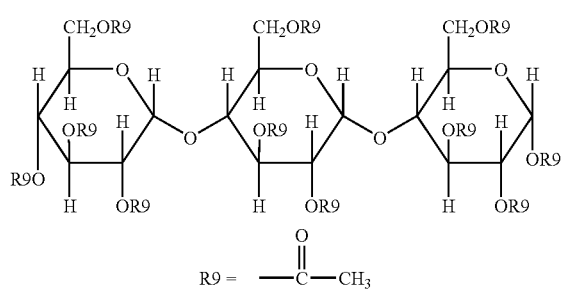

Compound (10)
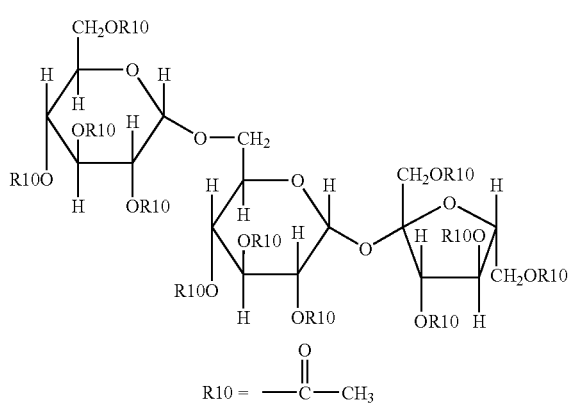
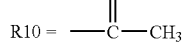

<Sulfone Compound>

The compound represented by following Formula (7) or (8) may be utilized in this invention.

In following Formula (7), $R^1$ is an alkyl group or an aryl group, and $R^2$ and $R^3$ are independently a hydrogen atom, an alkyl group or an aryl group. It is particularly preferred that the total number of carbon atoms in $R^1$, $R^2$ and $R^3$ is 10 or more.

The $R^4$ and $R^5$ in Formula (8) are each an alkyl group or an aryl group. The total number of carbon atoms in $R^4$ and $R^5$ is 10 or more. The alkyl group and aryl group may each contain a substituent. The preferable examples of the substituent include a fluorine atom, an alkyl group, an aryl group, an alkoxy group, a sulfone group and a sulfone amide group; and specifically preferable examples are an alkyl group, an aryl group, an alkoxy group, a sulfone group and a sulfone amide group.

Formula (7)
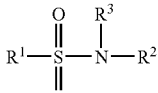

Formula (8)
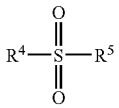

The alkyl group may be straight, branched or cyclic. The number of carbon atoms contained is preferably in the range of 1-25, more preferably in the range of 6-25, and still more preferably in the range of 6-20 (e.g., methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nanodecyl and didecyl). The aryl group preferably has 6-30 carbons and more preferably 6-24 (e.g., phenyl, biphenyl, terphenyl, naphthyl, binaphthyl and triphenylphenyl).

The following shows the preferred examples of the compounds represented by Formula (7) or Formula (8), without the present invention being restricted thereto:

A-1
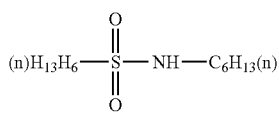

A-2
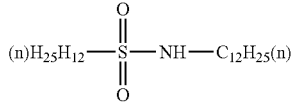

A-3
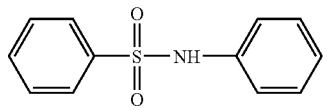

A-4
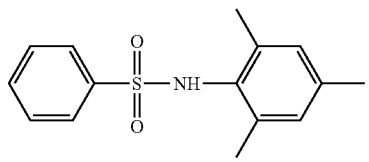

A-5
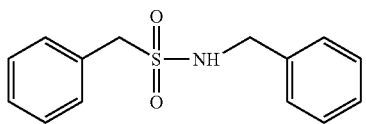

A-6

-continued
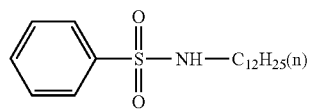
A-7
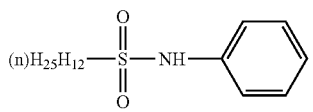
A-8
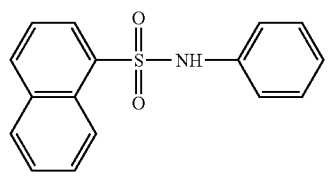
A-9
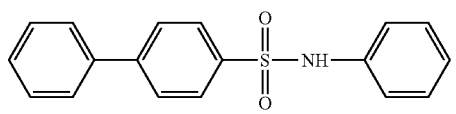
A-10
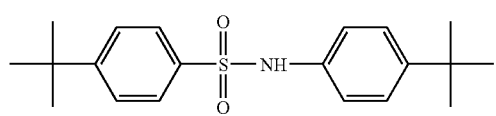
A-11
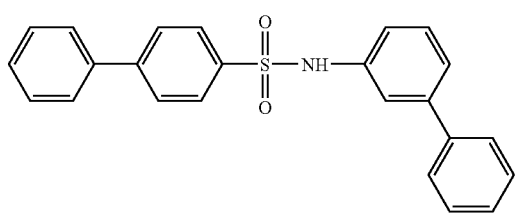
A-12
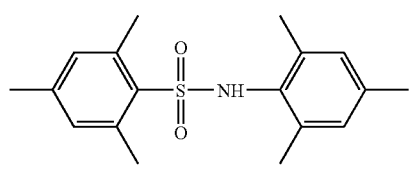
A-13
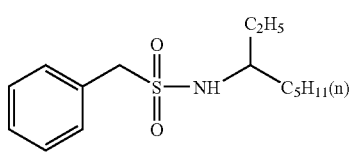
A-14
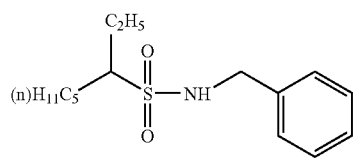
A-15
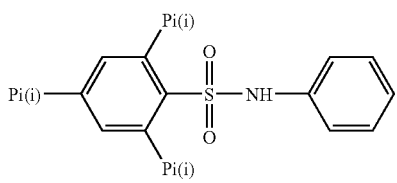
A-16
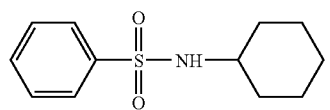
A-17
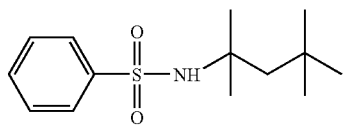
A-18
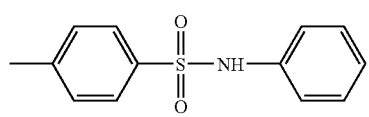
A-19
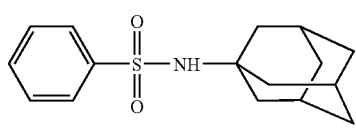
A-20
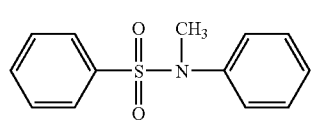
A-21
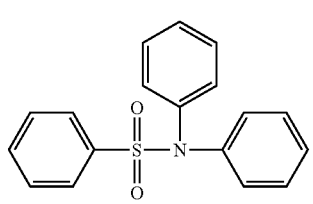
A-22

-continued
A-23
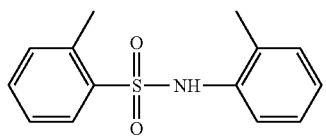
A-24
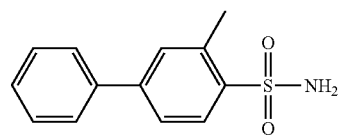
A-25
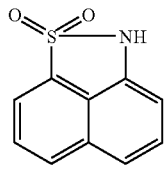
A-26
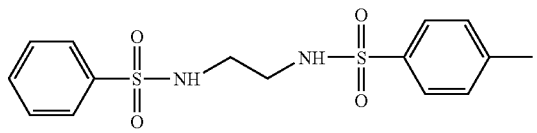
A-27
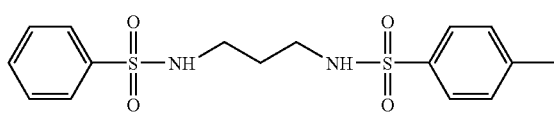
A-28
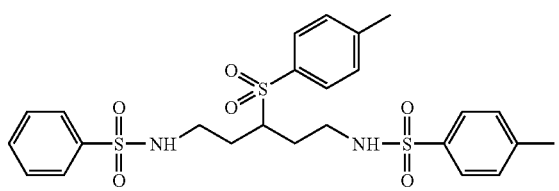
A-29
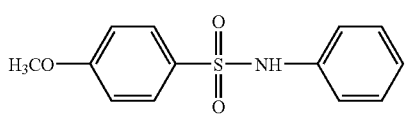
A-30
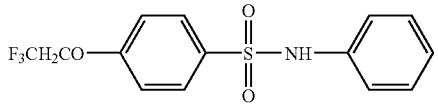
A-31
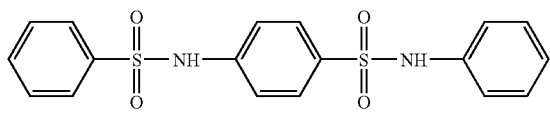
A-32
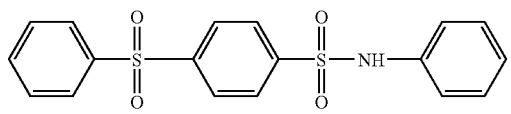
A-33
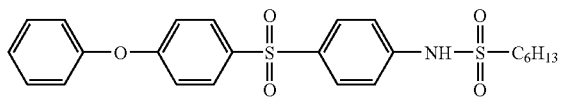
A-34
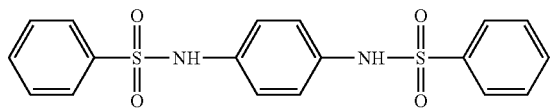
A-35
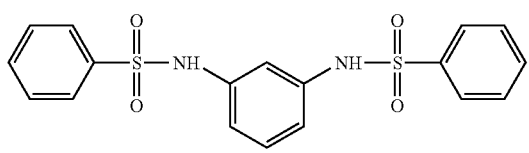
A-36
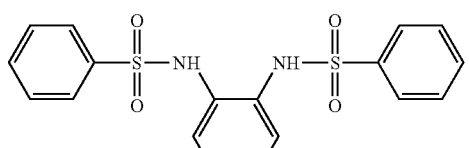
A-37
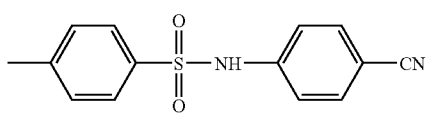
A-38
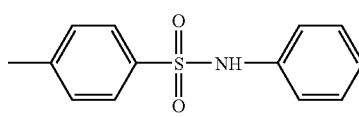
A-39
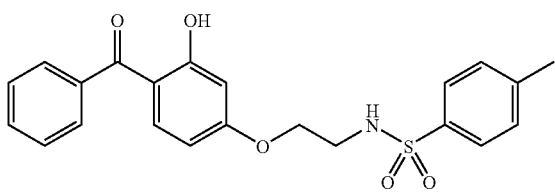
A-40
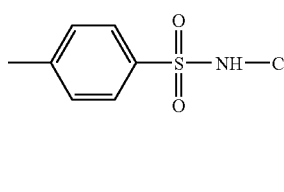
A-41
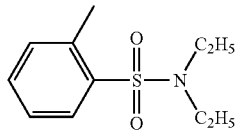
A-42

-continued
A-43
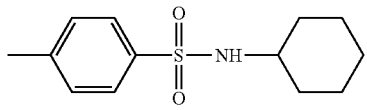
A-44
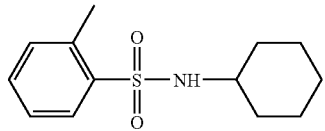
A-45
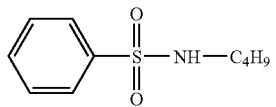
A-46
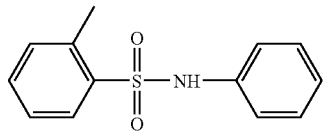
A-47
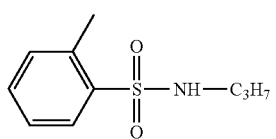
A-48
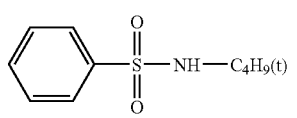
A-49
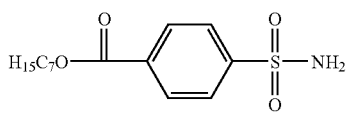
A-50
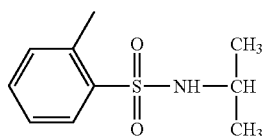
A-51
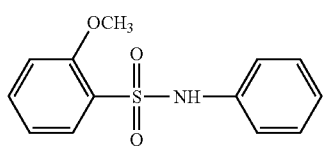
B-1
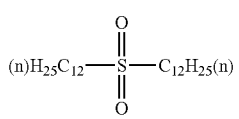
B-2
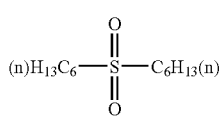
B-3
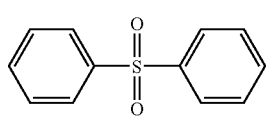
B-4
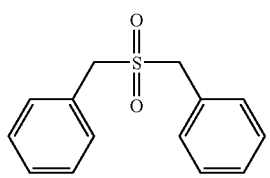
B-5
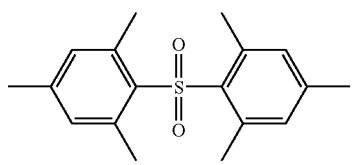
B-6
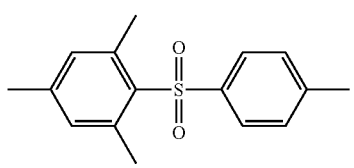
B-7
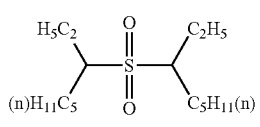
B-8
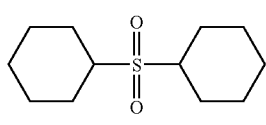
B-9
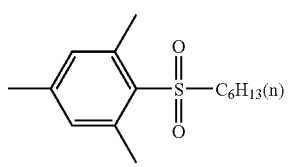

-continued
| | |
|---|---|
| B-10 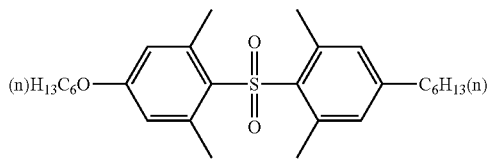 | B-11 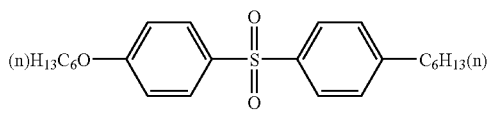 |
| B-12 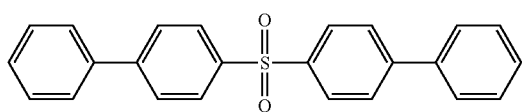 | B-13 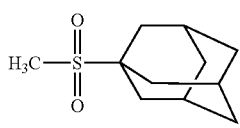 |
| B-14 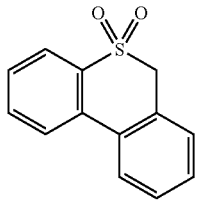 | B-15 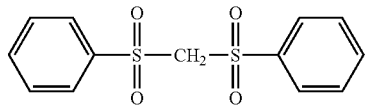 |
| B-16 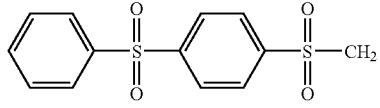 | B-17 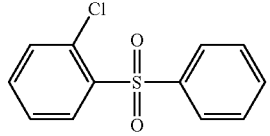 |
| B-18 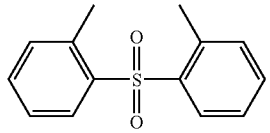 | B-19 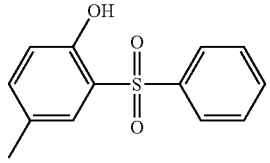 |
| B-20 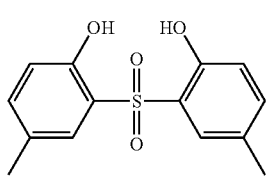 | B-21 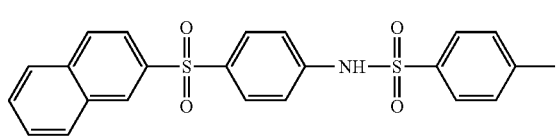 |
| B-22 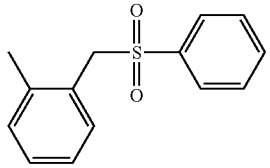 | |
| B-23 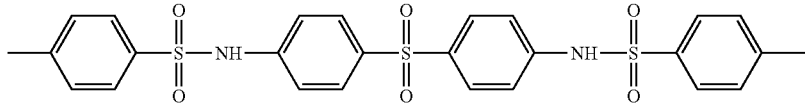 | |
| B-24 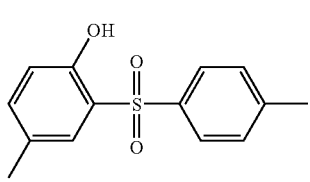 | B-25 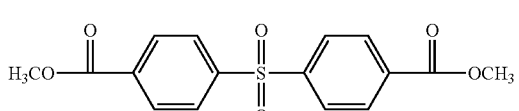 |

B-26 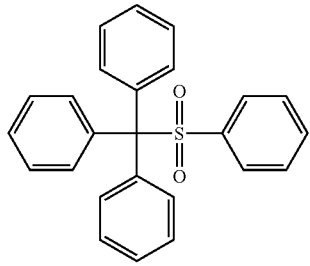

B-27 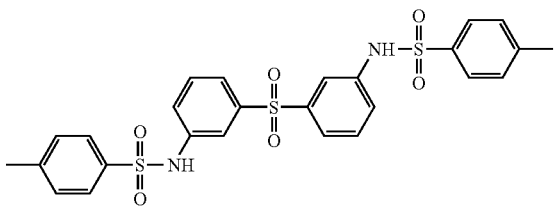

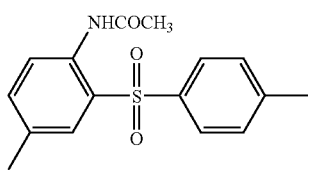

B-28 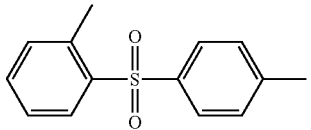 B-29

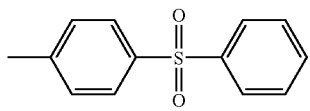

B-30 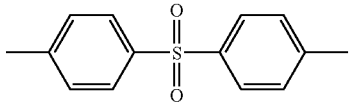 B-31

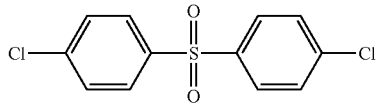

B-32 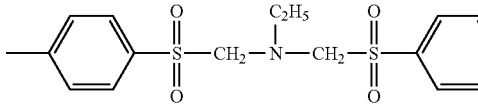 B-33

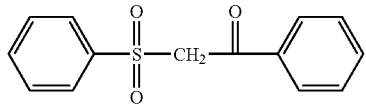

B-34 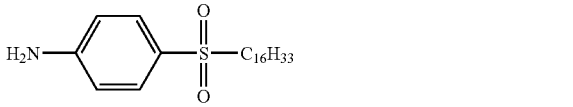 B-35

<Coordination Method of ΔRt(t) and ΔRt(h)>

The coordination method of ΔRt(t) and ΔRt(h) of the polarizing plate protective film utilized in the present invention is: firstly, it is necessary to utilize cellulose ester film having a thickness of 50 μm or less as a polarizing plate protective film.

That is, in this invention, in the polarizing plate arranged on the backlight side of the liquid crystal cell, it is essential that the values of Ro and Rt of the polarizing protective film provided on the liquid crystal cell side of the polarizer satisfy the above Formulas (i) and (ii), and also the thickness of the polarizing plate protective film is 20-50 μm, preferably 25-40 μm. When the thickness exceeds 50 μm, it becomes difficult to control the values of ΔRt (t) and ΔRt (h) within the range of this invention. Further, when the thickness is less than 20 μm, dimensional stability as a polarizing plate protective film becomes problematic, and it may result in bad effects on corner unevenness (being light leakage). To adjust the values of ΔRt (t) and ΔRt (h) of the above polarizing plate protective film to the range of this invention, it is not sufficient to use the cellulose ester film having the above thickness, and it is necessary to appropriately adjust the additives and production conditions. The coordination method is not specifically limited, however, the values of ΔRt (t) and ΔRt (h) of the polarizing plate protective film may be coordinated with the following method independently, or in combination. In the cellulose ester film, when the values of Ro and Rt are coordinated, utilized may be a method to adjust the drawn ratio, in addition to appropriately select the type and quantity of retardation adjusting agents, such as the above negative orientation birefringence. When the values of ΔRt (t) and ΔRt (h) of the polarizing plate protective film are coordinated, it is preferable that the type and quantity of the retardation adjusting agents are coordinated so that the drawn ration of the polarizing plate protective film of the TD direction (referred to as a perpendicular direction or a width direction) becomes to 0-15%.

Further, when the values of ΔRt(t) and ΔRt(h) of the polarizing plate protective film are coordinated, it is preferable that the residual solvent amount at the time of separating a web from a metal support for casting is made to be low, and specifically 150% by mass or less. Further, to ensure excellent flatness of the web-form cellulose ester polarizing plate protective film, the residual solvent amount at the time of separating a web from a metal support is preferably 10-150% by mass, more preferably 20-40% by mass or 60-130% by mass, and specifically preferably 20-30% by mass or 70-120% by mass.

In the present invention, the residual solvent amount is defined by the following equation:

Residual solvent amount(% by mass)=[(M−N)/N]×100

Herein, M is a mass of a sample picked at a given time during or after manufacture of a web or film, and N is a mass after heating at 115° C. for 1 hour.

As the other method to coordinate the values of ΔRt(t) and ΔRt(h) of the polarizing plate protective film, utilized may be a method to lower the peel-apart tension at the time of separating the web from the metal support for casting, and the tension is preferably at most 15 Kg/m.

The polarizing plate protective film of the present invention provides greater advantages when the liquid crystal cell substrate on the backlight side is equipped with an electrode for generating a lateral electric field (being IPS mode).

In the liquid crystal display apparatus of this invention, $\Delta Rt(t)$ of the polarizing plate protective film on the liquid crystal cell side of the polarizer of the polarizing plate which is provided on the backlight light-source side of the liquid crystal cell, is: $0$ nm$\leq\Delta Rt(t)\leq 7$ nm, while $\Delta Rt(h)$ is: $0$ nm$\leq\Delta Rt(h)\leq 20$ nm. Preferably, the $\Delta Rt(t)$ is: $0$ nm$\leq\Delta Rt(t)\leq 5$ nm, and $\Delta Rt(h)$ is: $0$ nm$\leq\Delta Rt(h)\leq 15$ nm.

In the present invention, since the dependency of $\Delta Rt$ is greater than that of $\Delta Ro$, the mechanical properties in the direction of film surface and film thickness are not necessarily required to be equivalent to each other. The so-called modulus of elasticity in the MD direction (film forming direction by casting) is preferably greater than that in the TD direction (across the width, namely, direction perpendicular to the film forming direction by casting). The ratio of the modulus of elasticity in the MD/TD is preferably in the range of 1.05-1.25.

The tensile modulus of elasticity can be obtained by measuring the stress at an elongation of 0.5% with a tensile speed of 10%/min. in atmosphere of 23° C. and 55% RH using the universal tension tester STM T50BP, manufactured by Toyo Baldwin Co., Ltd. In the liquid crystal display apparatus of this invention, the polarizing plate protective film arranged on the liquid crystal cell side of the polarizer of the polarizing plate provided on the viewing side of the liquid crystal cell preferably exhibits Ro of 0-5 nm and Rt of 30-80 nm. And, the film thickness is preferably 30-90 μm.

As the above polarizing plate protective film, the well-known polarizing plate protective film may be utilized. There is no need of coating with a new retardation film layer or combining with a retardation film. The currently used polarizing plate protective film exhibiting a thickness of 30-90 μm can be used as it is.

In the liquid crystal display apparatus of this invention, modulus of photoelasticity C (590 nm (m2/N)) of the polarizing plate protective film is preferably $1.0\times 10^{-12}$–$2.0\times 10^{-11}$.

In the liquid crystal display apparatus of this invention, the total of the Ro's of both the polarizing plate protective films on the liquid crystal cell side of the polarizer of the polarizing plate provided on the viewing side of the liquid crystal cell, and the polarizing plate protective films on the liquid crystal cell side of the polarizer of the polarizing plate provided on the backlight light-source side of the liquid crystal cell, is preferably 0-10 nm, and more preferably 0-5 nm. Further, the total of Rt's is preferably 30-85 nm, and more preferably 30-60 nm. The thickness of the polarizing plate protective film on the viewing side is preferably 20-50 μm, and the thickness of the polarizing plate protective film on the backlight side is preferably 30-90 μm. And, the above total film thickness of both polarizing plate protective films is preferably 50-120 μm, and more preferably 50-100 μm.

<Other Additives>

In the liquid crystal display apparatus of this invention, the polarizing plate protective film utilized the polarizing plate protective film on the liquid crystal cell side of the polarizer of the polarizing plate provided on the backlight light-source side of the liquid crystal cell, may appropriately contain the additives which can be added to the conventional polarizing plate protective film, in addition to the above negative orientation birefringence compound.

These additives include a plasticizer, an ultraviolet absorber, and microscopic particles.

The plasticizer usable in this invention is not particularly limited, but cited are preferably a polyvalent carboxylic acid ester plasticizer, a glycolate plasticizer, a phthalic acid ester plasticizer, a fatty acid ester plasticizer, a polyvalent alcohol ester plasticizer, a polyester plasticizer, and an acryl plasticizer. When two or more of these plasticizers are utilized, at least one of them is preferably a polyvalent alcohol ester plasticizer.

The polyvalent alcohol ester plasticizer is a plasticizer made up of an aliphatic polyvalent alcohol having a valence of 2 or more and a monocarboxylic acid ester. The molecule is preferred to contain an aromatic ring or cycloalkyl ring. It is preferably an aliphatic polyvalent alcohol ester having a valence of 2-20.

The ultraviolet absorber that can be used in the present invention is capable of absorbing the ultraviolet rays of 400 nm or less. This is intended to enhance the durability, and especially the transmittance at a wavelength of 370 nm is preferably 10% or less, more preferably 5% or less, and still more preferably 2% or less.

There is no particular restriction to the ultraviolet absorber used in the present invention. It can be exemplified by an oxybenzophenone compound, a benzotriazole compound, a salicylic acid ester compound, a benzophenone compound, a cyanoacrylate compound, a triazine compound, a nickel complex salt compound, and an inorganic powder. The high molecular type ultraviolet absorber can also be employed.

Examples of the inorganic compounds of the microscopic particles used in the present invention include silicon dioxide, titanium dioxide, aluminum oxide, zirconium oxide, potassium carbonate, potassium carbonate, talc, clay, sintered kaolin, baked potassium silicate, hydrated potassium silicate, aluminum silicate, magnesium silicate and potassium phosphate. The microscopic particles containing silicon are preferred due to its low turbidity. Especially the silicon dioxide is preferred.

The average diameter of the primary particles of the microscopic particles is preferably 5-50 nm, and more preferably 7-20 nm. These particles are preferably contained mainly as the secondary coagula having a particle diameter of 0.05-0.3 μm. The amount of such particles contained in the cellulose ester film is preferably 0.05-1% by mass, and more preferably 0.1-0.5% by mass. The surface of the cellulose ester film of multi-layer structure by the co-casting method preferably contains this amount of particles.

Silicon dioxide particles are commercially available, for example, under the trade name of AEROSIL R972, R972V, R974, R812, 200, 200V, 300, R202, OX50 and TT600 (all produced by Nippon Aerosil Co., Ltd.). They can be used in the present invention.

Zirconium oxide particles are commercially available, for example, under the trade name of AEROSIL R976 and R811 (all produced by Nippon Aerosil Co., Ltd.), and they can be used in the present invention.

Examples of the polymer include a silicone resin, a fluorine resin, and an acryl resin. The silicone resin is preferably used. Especially the silicone resin of a 3D network structure is preferably utilized. They are commercially available, for example, under the trade name of TOSPEARL 103, 105, 108, 120, 145, 3120 and 240 (all produced by Toshiba Silicone Co., Ltd.). They can be used in the present invention.

Of these, the AEROSIL 200V and AEROSIL R972V are preferably used due to their effect of reducing the friction coefficient while keeping the turbidity of the cellulose ester film low.

(Polarizing Plate Protective Film Production Method)

The following describes the method of producing the cellulose ester film for forming the polarizing plate protective film on the electrode and non-electrode sides in the present invention.

The cellulose ester film used in the present invention is preferably manufactured by the solution casting method or melt-casting method.

The cellulose ester film used in the present invention is manufactured by: a step of preparing a dope by dissolving in a solvent a cellulose ester, a compound containing negative double refraction performance in orientation, and additive; a casting the dope over an endless metallic support member traveling infinitely; a step of separation from the metallic support member; a orientation or width holding step as appropriate; and a step of winding the finished film.

The following describes the steps of preparing dope: The cellulose ester having greater density in the dope preferably reduces the drying load after having been cast over the metallic support member. However, if the cellulose ester has an excessive density, the load at the time of filtering will increase and the filtering accuracy will deteriorate. The density meeting these requirements is preferably in the range of 10-35% by mass, more preferably, 15-25% by mass.

One or more than two solvents can be used with a dope. A mixture of the good solvent and poor solvent of cellulose ester is preferably used for improved production efficiency. When a good solvent is contained in a greater percentage, it is preferably used due to good solubility of cellulose ester.

The preferred mixture ratio between the good solvent and poor solvent is such that the good solvent is in the range of 70-98% by mass while the poor solvent is in the range of 2-30% by mass. The good solvent can be defined as the solvent capable of independently dissolving the cellulose ester to be used, whereas the poor solvent can be defined as the one that independently swells or fails to dissolve.

Thus, depending on the average acetylation degree (acetyl group substitution ratio) of the cellulose ester, the same solvent can be either a good solvent or a poor solvent. For example, when acetone is used as a solvent, it is a good solvent for the acetic acid ester (acetyl group replacement ratio: 2.4) of the cellulose ester and cellulose acetate propionate, whereas it is a poor solvent for acetic acid ester (acetyl group replacement ratio 2.8) of the cellulose.

There is no particular restriction to the good solvent to be used in the present invention. It is possible to mention an organic halogen compound such as methylene chloride, and dioxolan, acetone, methyl acetate and acetomethyl acetate. The methylene chloride or methyl acetate is used with particular preference.

There is no particular restriction to the poor solvent to be used in the present invention. Preferably utilized examples include methanol, ethanol, n-butanol, cyclohexane, and cyclohexanone. Further, 0.01-2% by mass of water is preferably contained in the dope. The solvent having been reduced from the film by drying in the film production process is collected and recycled for use as the solvent used to dissolve the cellulose ester.

When the aforementioned dope is prepared, the cellulose ester can be dissolved by the commonly known method. A combination of heat and pressure allows heating in excess of the boiling point under normal pressure. It is preferable because generation of a granular insoluble residue, which is called as gel or flocculates, can be inhibited, when cellulose ester is dissolved with stirring while being heated at a temperature in a range of not lower than a boiling point under ordinary pressure without the solvent being boiled under pressure. In another method preferably used, cellulose ester is dissolved by further adding a good solvent after having been wetted or swelled by mixing with a poor solvent.

Pressure increase may be performed by a method to introduce an inert gas such as a nitrogen gas or a method to increase vapor pressure of a solvent by heating. Heating is preferably performed from outside and, for example, a jacket type equipment is preferable because of easy temperature control.

Heating temperature with addition of a solvent is preferably higher in view of solubility of cellulose ester. However, productivity may be deteriorated due to increase of a required pressure when the heating temperature is excessively high. The heating temperature is preferably 45-120° C., more preferably 60-110° C. and still more preferably 70-105° C. Further, pressure is adjusted not to boil a solvent at the set temperature.

In addition to these, a cold dissolution method is also preferably applied, and cellulose ester can be dissolved in the solvent such as methyl acetate by this method.

Then this cellulose ester solution is filtered by use of a suitable filter medium such as filter paper. As a filter medium, the absolute filtering precision is preferably smaller to eliminate insoluble residue. However, there is a problem of easy clogging of a filter medium when the absolute filtering precision is excessively small. Therefore, the absolute filtering precision of a filter medium is preferably not larger than 0.008 mm, more preferably 0.001-0.008 mm and still more preferably 0.003-0.006 mm.

There is no particular restriction to the material of a filter medium, and an ordinary filter medium can be utilized. However, a filter medium made of plastic such as polypropylene and Teflon (a registered trademark) and a filter medium made of metal such as stainless steel are preferable because there is no such a problem as release of fiber from a filter medium. It is preferable to eliminate and reduce impurities and foreign materials in particular that may produce a bright spot defect having been contained in cellulose ester as a raw material by filtration.

Foreign materials causing bright spot defects refers to spots (foreign materials) which are visible due to light leak, when two sheets of polarizing plates, between which roll-like cellulose ester is placed, are arranged in a crossed Nicols state, and light is applied from one of the polarizing plate side to be observed from the other polarizing plate side. The number of bright spots having a diameter of not less than 0.01 mm is preferably not more than 200 spots/$cm^2$, more preferably not more than 100 spots/not more than 200 spots/$cm^2$, still more preferably not more than 50 spots/$cm^2$ and most preferably 0-10 sport/$cm^2$. Further, the number of bright spot defects of not larger than 0.01 mm is preferably smaller as well.

Filtering of a dope can be performed by an ordinary method. However, a method to filter while heating at a temperature of not lower than a boiling point of a solvent at ordinary pressure without the solvent being boiled under pressure is preferable because of small increase of a difference of filter pressures before and after filtering (referred to as a pressure difference). The preferable temperature is 45-120° C., more preferably 45-70° C. and furthermore preferably 45-55° C.

Filter pressure is preferably lower. The filter pressure is preferably not higher than 1.6 MPa, more preferably not higher than 1.2 MPa and still more preferably not higher than 1.0 MPa.

Now, casting of a dope will be explained.

A metal support in a casting process preferably has its surface mirror-finished. A stainless steel belt or a drum made of castings, the surface of which is mirror-finished, is utilized as the support metal. The cast width can be set to 1-4 m. The surface temperature of a metal support in a cast process is from −50° C. to lower than a boiling point of a solvent and the temperature is preferably higher since web drying speed is fast. However, excessively high temperature may sometimes cause foaming of a web or deterioration of flatness. The support temperature is preferably 0-40° C. and more preferably 5-30° C.

There is no particular restriction to the method to control the temperature of a metal support. There are a method to blow a hot wind or a cold wind on the web and a method to make hot water contact the rear side of a metal support. A method to utilize hot water is preferable because the time required for the metal support to reach a constant temperature is reduced due to more efficient heat transfer by use of hot water. In the case of employing hot wind, the wind of a temperature higher than the aimed temperature may be employed.

Further, in a drying process of web-form cellulose ester drying process, after the web is separated from a metal support, the web is further dried so that the residual solvent amount will be not more than 1% by mass, more preferably not more than 0.1% by mass and still more preferably 0-0.01% by mass.

What is used in a typical film drying process is a roll drying method (in which a web is dried while being alternately passed over many rolls arranged at upper and lower positions) or a method to dry a web while it is transported via a tenter method.

When the web-form cellulose ester utilized in the present invention is prepared with drawing, it is specifically preferable that a web is stretched in the transport direction (along its length) immediately after having been separated from a metal casting support while with carrying a large amount of residual solvent, and is further stretched across its width by means of a tenter method, which grips both edges of the web with clips and other means (being based on relationship with the IPS type liquid crystal cell).

The liquid crystal layer of the liquid crystal panel of the IPS type liquid crystal display apparatus exhibits a homogenous alignment of being parallel to the surface of the substrate in the initial state, and also a director of the liquid crystal layer exhibits to be parallel to the direction of an electron wiring, or at some angle thereto, in the plane being parallel to the substrate, when no voltage is applied. When voltage is applied, the direction of the director of the liquid crystal layer shifts perpendicular to the direction of electrode wiring according to which way voltage is applied. When the direction of the director of the liquid crystal layer is shifted 45° in the direction of electrode wiring while no voltage is applied, the liquid crystal layer to which voltage is applied, rotates the angle of direction of polarization at 90° as if a half-wave plate, resulting in white display due to agreement of a transmission axis of the polarizing plate on output side and the angle of direction of polarization.

Generally, the liquid crystal layer is of a fixed thickness. It is possible to consider that, since an IPS system is employed, the thickness of the liquid crystal layer is preferably provided with a slight variation in order to improve response speed to switching operations. Thus, the present invention provides maximum advantage even if the thickness of the liquid crystal layer is not fixed.

In the liquid crystal display apparatus of this invention, there is no adverse effect resulting from variation in thickness of the liquid crystal layer, however, thickness of the liquid crystal layer capable of ensuring the advantages of the present invention is preferably 2-6 μm, but more preferably 3-5.5 μm.

The liquid crystal display apparatus of the present invention is employed in a large-sized liquid crystal television sets. In terms of screen size, it is used in common 17-inch screen television sets, but preferably in those of 26-100 inch screens.

The IPS type liquid crystal display apparatus includes FFS (Fringe Field Switching) mode and FLC (ferroelectric liquid crystal) mode, in addition to the so-called IPS mode.

EXAMPLE

The following specifically describes the present invention with reference to examples, without the present invention being restricted thereto.

<Recipe 1: Production of samples of Polarizing Plate Protective Films 1-12>

(Dope composition: Recipe A)

| | |
|---|---|
| Triacetyl cellulose (acetylation degree: 61.0%) | 85 parts by mass |
| 2-(2'-hydroxy-3',5'-di-t-butylphenyl) bezotriazole | 1.5 parts by mass |

Retardation adjusting agent (being a compound exhibiting a negative orientation birefringence)

| | |
|---|---|
| (1) Methyl methacrylate-2-hydroxyethyl acrylate copolymer [80/20 (mass ratio)] Mw: 8,000 | 8 parts by mass |
| (2) Methyl acrylate polymer (*) Mw: 1,000 | 5 parts by mass |
| (3) Methylene chloride | 475 parts by mass |
| (4) Ethanol | 50 parts by mass |

(*) A methyl acrylate monomer was polymerized according to the method of polymerization described in Example 3 of Unexamined Japanese Patent Application Publication No. 2000-128911, whereby a polymer of Mw: 1,000 and Mn: 700 was produced. The hydroxyl value (being OHV: mg/g KOH) of this reaction product was 50.

(Matting Agent Solution Composition)

| | |
|---|---|
| Silica particle dispersion with an average particle diameter of 16 nm | 11.0 parts by mass |
| Methylene chloride (first solvent) | 76.1 parts by mass |
| Ethanol (second solvent) | 3.5 parts by mass |
| Acetyl propionyl cellulose (acetyl replacement ratio 2.06, propionyl replacement ratio 0.79) | 1.9 parts by mass |

(Preparing Matting Agent Solution)

20 parts by mass of the silica particle (AEROSIL R972, produced by Nippon Aerosil Co., Ltd.), having an average particle diameter of 16 nm and 80 parts by mass of methanol, were stirred and mixed sufficiently for 30 minutes, whereby a silica particle dispersion was produced. This dispersion, together with the following compositions, was placed into a homogenizer, and was stirred for further 30 minutes to allow each component to be dissolved, whereby a matting agent solution was prepared.

(Preparation of Polarizing Plate Protective Film)

Dope composition A according to the above recipe was placed into an enclosed container and was heated to 70° C. Cellulose triacetate (TAC) was stirred and completely dissolved, whereby a dope was prepared. Four hours were required for dissolution. After dope composition A was filtered, it was blended with 6.5 parts by mass of matting agent solution, and the mixture was uniformly cast over a 22° C. stainless steel band support, using a belt casting device at a dope temperature of 35° C. The temperature of the stainless steel band support member was 20° C.

After that, the mixture was dried until it could be separated from the support. The amount of the residual solvent of the dope was 25% by mass. Three minutes were typically required from dope casting to separation. After having been separated from the stainless steel band support at a tension of 10 kg/m, the web was stretched 2% across the width via tenter at 140° C. While being conveyed by a large number of rollers, the web was dried in several drying zones at 120° C. and 135° C. Both edges of the film were knurled at a width of 10 mm and a height of 5 μm, whereby 40 μm thick cellulose triacetate film of polarizing plate protective film sample 1, was prepared.

The film width of the above polarizing plate protective film was 1,500 mm, at a wound up length of 500 m. Haze (measured via a Haze Meter HM 150, manufactured by Murakami Color Technology Research Laboratory Co., Ltd.) was 3%, and transmittance as a single unit (measured by a spectrophotometer, manufactured by Hitachi, Ltd.) was 97%. The tensile modulus of elasticity in the MD direction was 4.6 GPa, and that in the TD direction was 3.9 GPa. The winding tension was such that the initial tension was 10 kg/m and the final winding tension was 8 kg/m.

(Preparation of Polarizing Plate Protective Film Samples 2-12)

Samples 2-12 were prepared in the same manner as sample 1, except that thickness, draw ratio, residual solvent, and separation tension were changed as described in Table 1.

<Recipe 2: Production of samples 13-22 of polarizing plate protective films>

(Additive solution composition)

Retardation adjusting agent (being a compound Exhibiting a negative orientation birefringence)

| | |
|---|---|
| p-toluene sulfone anilide | 44.3 parts by mass |
| 2-hydroxy-4-otanoxybenzophene | 7.9 parts by mass |
| Methylene chloride (first solvent) | 58.8 parts by mass |
| Methanol (second solvent) | 8.4 parts by mass |
| Triacetyl cellulose (acetylation degree: 61.0%) | 2.2 parts by mass |

Sample 13 was prepared in the same manner as sample 1, after 5.6 parts by mass of the above dope composition B, and 1.8 parts by mass of the matting agent solution were filtered and were then mixed. The thickness was 40 μm, the modulus of elasticity in the MD direction was 4.4 GPa, and the modulus of elasticity in the TD direction was 3.6 GPa. Samples 14-22 were prepared in the same manner as sample 13, except that thickness, draw ratio, residual solvent, and separation tension were changed as described in Table 1.

<Recipe 3: Production of Sample 23 of Polarizing Plate Protective Film>

Sample 23 was prepared in the same manner as sample 1, except that methacrylate-2-hydroxyethyl acrylate copolymer and methyl acrylate copolymer of above dope composition A were replaced with 13 parts by mass of octaacetyl sucrose.

Konica Minolta Tac KC4UY (a 40 μm TAC film, hereinafter abbreviated as "4UY") and KC8UY (an 80 μm TAC film, hereinafter abbreviated as "8UY") produced by Konica Minolta Opto, Inc., and Fuji Tac UZ-TAC 40 μm (hereinafter referred to as "4UZ") and 80 μm (hereinafter referred to as "8UZ") produced by Fuji Photo Film Co. Ltd., were used as the polarizing plate protective film on the non-electrode side. Regarding these commercially available films, the thickness and the retardation value are shown in Table 1, but Rt values of them are largely beyond the range of this invention.

Retardation values exhibited some variations among production lots. The value measured for each lot used in the test was utilized. Table 1 shows the measured values.

TABLE 1

| Sample | Thickness (μm) | Retardation value adjusting agent (part by mass) | Draw ratio (width direction) | Residual solvent (% by mass) | Separation tension | Retardation (nm) | | | |
|---|---|---|---|---|---|---|---|---|---|
| | | | | | | Ro | Rt | ΔRt (t) | ΔRt (h) |
| 1 | 40 | *1 (13) | 2 | 25 | 10 | 0.2 | 1 | 5 | 10 |
| 2 | 50 | *1 (13) | 2 | 25 | 10 | 0.4 | 0.5 | 6.5 | 15 |
| 3 | 30 | *1 (13) | 2 | 25 | 10 | 0.3 | 1.3 | 4 | 9 |
| 4 | 20 | *1 (13) | 2 | 25 | 10 | 0.2 | 1.5 | 3 | 6 |
| 5 | 60 | *1 (13) | 2 | 25 | 10 | 0.4 | 0 | 8 | 15 |
| 6 | 80 | *1 (13) | 2 | 25 | 10 | 0.5 | −2 | 11 | 23 |
| 7 | 40 | *1 (13) | 15 | 25 | 10 | 0.4 | 1 | 6 | 10 |
| 8 | 40 | *1 (13) | 20 | 25 | 10 | 0.7 | 1.2 | 7 | 10 |
| 9 | 40 | *1 (13) | 2 | 130 | 10 | 0.3 | 0 | 5 | 9 |
| 10 | 40 | *1 (13) | 2 | 160 | 10 | ** | | | |
| 11 | 40 | *1 (13) | 2 | 25 | 13 | 0.7 | 2.5 | 6 | 11 |
| 12 | 40 | *1 (13) | 2 | 25 | 18 | 1.5 | 2.5 | 9 | 13 |
| 13 | 40 | A-4(44.3) | 2 | 25 | 10 | 1.5 | 2.5 | 5 | 12 |
| 14 | 50 | A-4(44.3) | 2 | 25 | 10 | 1.7 | 3 | 7 | 18 |
| 15 | 30 | A-4(44.3) | 2 | 25 | 10 | 1.2 | 2 | 4.5 | 10 |
| 16 | 80 | A-4(44.3) | 2 | 25 | 10 | 2 | 5 | 8 | 24 |
| 17 | 40 | A-4(44.3) | 15 | 25 | 10 | 2 | 5 | 6.5 | 17 |
| 18 | 40 | A-4(44.3) | 20 | 25 | 10 | 3 | 6 | 8.0 | 19 |
| 19 | 40 | A-4(44.3) | 2 | 130 | 10 | 0.9 | 2 | 7 | 13 |
| 20 | 40 | A-4(44.3) | 2 | 160 | 10 | 2.5 | 0 | 9 | 15 |
| 21 | 40 | A-4(44.3) | 2 | 25 | 13 | 1.0 | 2.5 | 6 | 12 |
| 22 | 40 | A-4(44.3) | 2 | 25 | 18 | 2.5 | 3 | 11 | 12 |
| 23 | 40 | *2 (13) | 2 | 25 | 10 | 0.3 | 1 | 6 | 13 |
| 4UY | 40 | — | — | — | — | 0.5 | 39 | 7.5 | 15 |
| 8UY | 80 | — | — | — | — | 1 | 75 | 16 | 33 |
| 4UZ | 40 | — | — | — | — | 2.2 | 40 | 7 | 15 |
| 8UZ | 80 | — | — | — | — | 2.5 | 60 | 12 | 30 |

*1: The total value of methyl methacrylate-2-hydroxyethl acrylate copolymer of 8 parts by mass and methyl acrylate polymer of 5 parts by mass,
*2: Octaacetyl sucrose,
**: cannot separate (Preparation of Polarizing Plates 1-31)

A polarizing plate was produced using the above polarizing plate protective film.

(Production of a Polarizer)

An 80 μm×3,100 mm×800 m polyvinyl alcohol film (produced by Kuraray Co., Ltd., having an average degree of polymerization of 2400, and a degree of saponification of 99.9 mol %) was immersed in 30° C. pure water for 60 seconds and was allowed to swell. At the same time, the film was uniaxially drawn along the length (along the flow direction) to the draw ratio of 2.5. Then the film was immersed in an aqueous solution containing iodine/potassium iodide (at mass ratio of 1/10, and a density of 0.05% at 30° C.) for 60 seconds. At the same time, the film was further drawn for an overall draw ratio of 2.8. After that, the film was drawn in an aqueous solution containing boric acid with a density of 3% by mass at 40° C. and potassium iodide with a density of 2% by mass for an overall draw ratio of 3.

Subsequently, the film was drawn in a 60° C. aqueous solution containing boric acid (at a density of 4% by mass) and potassium iodide (at a density of 3% by mass) for an overall draw ration of 6. After that, the film was immersed in a 25° C. aqueous solution containing potassium iodide at a density of 5% by mass for 30 seconds, while the film was not drawn. Then with the tension maintaining unchanged, the film was dried at 40° C. for one minute, whereby a polarizer at a thickness of 20 μm and a width of 1,550 mm was produced. The polarizer was produced on a continuous basis.

(Production of Polarizing Plates 1-31)

The above polarizer and the sample film were conveyed along the length, and the cell side surface of the polarizer was bonded using a polyvinyl alcohol adhesive. Then Konica Minolta TAC KC4UY was bonded on the opposite surface of the cell via a roll-to-roll basis, thereby producing polarizing plates 1-31.

(Evaluation of Polarizing Plate)

The obtained polarizing plate was used to evaluate the color shift in an oblique direction and contrast according to the following procedure. Table 1 shows the results of these evaluations. For portions wherein the size was insufficient, a polarizing plate was manufactured in the form of a sheet.

<Method of Measuring the Thickness>

When the thickness was less than 10 μm, it was measured by a thin-film spectrophotometer, "Instantaneous Multiple Photometric System MCPD-2000", manufactured by Otsuka Denshi Co., Ltd. When the thickness was 10 μm or more, it was measured by a digital micrometer, "KC-351C" manufactured by Anritsu Corporation.

<Method of Measuring the Contrast Ratio of Liquid Crystal Display Apparatus>

The contrast ratio of the liquid crystal display apparatus was measured in a 23° C. dark room according to the following procedure using a liquid crystal cell and measuring instrument.

The liquid crystal panel was removed from the liquid crystal display apparatus (Panasonic liquid crystal television set VIEPA TH-26LX60, manufactured by Matsushita Electric Industrial, Co., Ltd.) containing the above IPS mode liquid crystal cell, and the polarizing plates arranged up and down sides of the liquid crystal cell were removed. After that, the glass surfaces (front and rear) of this liquid crystal cell was thoroughly washed. Then the polarizing plate of the present invention was bonded on both surfaces of the liquid crystal cell using a 20 μm thick acryl adhesive so that the retardation axis of the polarizer would be parallel to the long side of the liquid crystal cell (being 0±0.2 degrees).

A white image and black image were displayed onto this liquid crystal display apparatus, and the Y value of the XYZ display system was measured a 45° angle of direction and a 60° polar angle on the display screen, using an "EZ Contrast 160D", manufactured by ELDIM S. A. From the Y value (YW) of the white image and the Y value (YB) of the black image, the contrast ratio "YW/YB" in an oblique direction was calculated. It is to be noted that the 45° angle of direction refers to the direction obtained by 45° counterclockwise rotation when the long side of the panel is assumed to be 0°. The polar angle of 60° refers to the direction obtained by tilting to an angle of 60° when the front surface of the display screen is assumed as 0°.

Liquid crystal cell: the cell, mounted on the Panasonic liquid crystal television set VIERA TH-26LX60, manufactured by Matsushita Electric Industrial, Co., Ltd.

<Method of Measuring the Amount of Color Shift of the Liquid Crystal Display Apparatus>

A black image was displayed onto the liquid crystal display apparatus, and the hue, value x and value y of all directions (360°) at the polar angle of 60° were measured using the "EZ Contrast 160D", manufactured by ELDIM S. A.

In value x and value y calculated via the EZ Contrast at a polar angle of 60° and at an angle of direction of 45°, difference Δxy between the maximum values of values x and y in all directions and the minimum values were calculated according to the following Formula:

$$\{[x\text{ (maximum)}-x\text{ (minimum)}]^2+[y\text{ (maximum)}-y\text{ (minimum)}]^2\}^{1/2}$$

It is to be noted that the angle of direction of 45° refers to the direction obtained by 45° counterclockwise rotation when the long side of the panel is assumed as 0°. The polar angle of 60° refers to the direction as viewed obliquely at an angle of 60° when the direction perpendicular to the panel is assumed to be 0°.

<Evaluation of Corner Unevenness (Light Leakage)>

The liquid crystal display apparatus was subjected to thermal processing at 60° C. and 90% RH for 1,500 hours and was then subjected to moisture conditioning at 25° C. and 60% RH for 20 hours. After that, a backlight was directed onto it, and corner unevenness (namely light leakage) in the black display area was evaluated using the following parameters.

A: Absolutely no peripheral light leakage was noted.
B: Hardly peripheral light leakage was noted.
C: Some peripheral light leakage was noted.
D: Serious peripheral light leakage was noted.

<Evaluation of a Gritty Feel>

Images of white, black, red, green and blue color bars were projected on the liquid crystal display apparatus, and an organoleptic test via visual observation was conducted to evaluate gritty perception of the pixels. In this case, since granular reproducibility was excellent, a liquid crystal television set W32L-H9000, manufactured by Hitachi, Ltd. was used since it enabled easy evaluation of gritty feel.

A . . . No gritty feel was noted.
B . . . Some gritty feel was noted.

In the present invention, a "soft image" impression one which was registered no gritty feel or a feel of graininess of the pixels.

TABLE 2

| | | Polarizing plate protective film | | | | Color shift | Contrast ratio | Corner unevenness | Gritty feel |
|---|---|---|---|---|---|---|---|---|---|
| | | T-1 | T-2 | T-3 | T-4 | | | | |
| 1 | Inv. | 4UY | 4UY | 1 | 4UY | 0.1 | 68 | A | A |
| 2 | Inv. | 4UY | 4UY | 2 | 4UY | 0.13 | 50 | B | A |
| 3 | Inv. | 4UY | 4UY | 3 | 4UY | 0.1 | 65 | A | A |
| 4 | Inv. | 4UY | 4UY | 4 | 4UY | 0.1 | 68 | A | A |
| 5 | Comp. | 4UY | 4UY | 5 | 4UY | 0.17 | 30 | D | A |
| 6 | Comp. | 4UY | 4UY | 6 | 4UY | 0.1 | 65 | D | A |
| 7 | Inv. | 4UY | 4UY | 7 | 4UY | 0.13 | 60 | B | A |
| 8 | Comp. | 4UY | 4UY | 8 | 4UY | 0.22 | 41 | D | A |
| 9 | Inv. | 4UY | 4UY | 9 | 4UY | 0.1 | 65 | A | A |
| 10 | Comp. | 4UY | 4UY | 10 | 4UY | — | — | — | — |
| 11 | Inv. | 4UY | 4UY | 11 | 4UY | 0.1 | 55 | A | A |
| 12 | Comp. | 4UY | 4UY | 12 | 4UY | 0.13 | 61 | D | A |
| 13 | Inv. | 4UY | 4UY | 13 | 4UY | 0.1 | 55 | B | A |
| 14 | Inv. | 4UY | 4UY | 14 | 4UY | 0.12 | 40 | C | A |
| 15 | Inv. | 4UY | 4UY | 15 | 4UY | 0.11 | 57 | B | A |
| 16 | Comp. | 4UY | 4UY | 16 | 4UY | 0.31 | 44 | D | A |
| 17 | Inv. | 4UY | 4UY | 17 | 4UY | 0.13 | 55 | C | A |
| 18 | Comp. | 4UY | 4UY | 18 | 4UY | 0.22 | 41 | D | A |
| 19 | Inv. | 4UY | 4UY | 19 | 4UY | 0.13 | 56 | C | A |
| 20 | Comp. | 4UY | 4UY | 20 | 4UY | 0.31 | 29 | D | A |
| 21 | Inv. | 4UY | 4UY | 21 | 4UY | 0.11 | 60 | B | A |
| 22 | Comp. | 4UY | 4UY | 22 | 4UY | 0.21 | 27 | D | A |
| 23 | Inv. | 4UY | 4UY | 23 | 4UY | 0.15 | 70 | B | A |
| 24 | Inv. | 4UY | 1 | 1 | 4UY | 0.1 | 60 | A | A |
| 25 | Inv. | 4UY | 13 | 13 | 4UY | 0.1 | 50 | B | A |
| 26 | Inv. | 8UY | 8UY | 1 | 4UY | 0.15 | 72 | B | A |
| 27 | Inv. | 8UY | 8UY | 13 | 4UZ | 0.13 | 60 | C | A |
| 28 | Comp. | 8UY | 1 | 6 | 8UY | 0.25 | 30 | D | B |
| 29 | Comp. | 8UY | 16 | 16 | 4UZ | 0.1 | 50 | D | B |
| 30 | Inv. | 8UY | 16 | 1 | 4UY | 0.1 | 65 | B | A |
| 31 | Inv. | 8UY | 1 | 4UY | 4UY | 0.25 | 50 | B | A |

Inv.: Invention,
Comp.: Comparative example

As shown in Table 2, even without using retardation film, the present invention achieves enhancement of color shift, contrast ratio, front contrast and gritty feel that could not be achieved by the usage of the retardation film according to the comparative examples.

What is claimed is:

1. An IPS (In Plane Switching) mode type liquid crystal display apparatus comprising a liquid crystal cell, a first polarizing plates provided on a viewing side of the liquid crystal cell, and a second polarizing plate provided on a backlight light-source side of the liquid crystal cell,
wherein the second polarizing plate comprising a polarizer, a first polarizing plate protective film provided on a liquid crystal cell side of the polarizer, a second polarizing plate protective film provided on a backlight light-source side, and
the second polarizing plate protective film is a cellulose ester film having a film thickness of 20-50 μm, wherein the cellulose ester film comprises a compound exhibiting negative orientation birefringence, and
Ro of the polarizing plate protective film of the second polarizing plate, Ro being expressed by the following Expression (i), satisfies the following relationship:

0 nm≦Ro≦2 nm and Rt of the polarizing plate protective film of the second polarizing plate, Rt being expressed by the following Expression (ii), satisfies the following relationship:

−5 nm≦Rt≦5 nm and in the second polarizing plate protective film, temperature fluctuation ΔRt (t) defined below satisfies the following relationship;

0 nm≦ΔRt(t)≦7 nm and humidity fluctuation ΔRt (h) defined below satisfies the following relationship;

0 nm≦ΔRt(h)≦20 nm wherein $$Ro=(nx-ny)\times d \quad \text{Expression (i)}$$

$$Rt=[(nx+ny)/2-nz]\times d \quad \text{Expression (ii)}$$

wherein nx is a refractive index in the retardation axis direction in the film plane of the cellulose ester film, ny is a refractive index in the direction perpendicular to the retardation axis, nz is a refractive index in the film thickness direction, and d is a film thickness (nm);

temperature fluctuation ΔRt (t): difference between Rt value under the environment of 23° C. and 55% RH for 24 hours, and Rt value under the environment of 35° C. and 27% RH for 24 hours; and humidity fluctuation ΔRt (h): difference between Rt value under the environment of 23° C. and 20% RH for 24 hours, and Rt value under the environment of 23° C. and 80% RH for 24 hours.

2. The IPS (In Plane Switching) mode type liquid crystal display apparatus of claim 1 wherein the cellulose ester film comprises an acryl polymer or a polyester.

3. The IPS (In Plane Switching) mode type liquid crystal display apparatus of claim 2 wherein the cellulose ester film comprises an acryl polymer.

4. The IPS (In Plane Switching) mode type liquid crystal display apparatus of claim 3 wherein the acryl polymer exhibits negative orientation birefringence.

5. The IPS (In Plane Switching) mode type liquid crystal display apparatus of claim 4 wherein a weight average molecular weight of the acryl polymer is 500 or more but not exceeding 30,000.

6. The IPS (In Plane Switching) mode type liquid crystal display apparatus of claim 1 wherein the cellulose ester film comprises polymer X obtained by copolymerization between an ethylenic unsaturated monomer Xa having no aromatic ring and hydrophilic group contained inside of a molecule, and an ethylenic unsaturated monomer Xb containing a hydrophilic group in a molecule wherein the polymer X has a weight average molecular weight of 5,000 or more without exceeding 30,000.

7. The IPS (In Plane Switching) mode type liquid crystal display apparatus of claim 6 wherein the polymer X has a weight average molecular weight of 5,000 or more without exceeding 30,000.

8. The IPS (In Plane Switching) mode type liquid crystal display apparatus of claim 6 wherein Xa is an acryl or a methacryl monomer without an aromatic ring or a hydrophilic group contained in the molecule, and Xb is an acryl or a methacryl monomer containing a hydrophilic group but not an aromatic ring in the molecule.

9. The IPS (In Plane Switching) mode type liquid crystal display apparatus of claim 6 wherein the cellulose ester film further comprises polymer Y obtained by polymerization of ethylenic unsaturated monomer Ya, having a weight average molecular weight 500 or more without exceeding 3,000.

10. The IPS (In Plane Switching) mode type liquid crystal display apparatus of claim 2 wherein the cellulose ester film comprises a polyester.

11. The IPS (In Plane Switching) mode type liquid crystal display apparatus of claim 10 wherein the polyester is represented by Formula (3) or (4):

$$B1\text{-}(G\text{-}A\text{-})_m G\text{-}B1 \qquad \text{Formula (3)}$$

wherein B1 is monocarboxylic acid, G is divalent alcohol and A is dibasic acid, none of B1, G and A containing an aromatic ring, and "m" is a repeating number;

$$B2\text{-}(A\text{-}G\text{-})_n A\text{-}B2 \qquad \text{Formula (4)}$$

wherein B2 is monoalcohol, G is divalent alcohol and A is dibasic acid, none of B2, G and A containing an aromatic ring, and "n" is a repeating number.

12. The IPS (In Plane Switching) mode type liquid crystal display apparatus of claim 1, wherein Ro and Rt are measured at 23° C. and 55% RH at a wavelength of 590 nm.

* * * * *